(12) United States Patent
Kim et al.

(10) Patent No.: US 10,873,737 B1
(45) Date of Patent: Dec. 22, 2020

(54) VR DEVICE AND CONTROL METHOD FOR THE SAME

(71) Applicant: LG ELECTRONICS INC., Seoul (KR)

(72) Inventors: Kyungyong Kim, Seoul (KR); Hongsuk Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/550,759

(22) Filed: Aug. 26, 2019

(30) Foreign Application Priority Data

Aug. 16, 2019 (KR) ........................ 10-2019-0100315

(51) Int. Cl.
| | | |
|---|---|---|
| *H04N 13/194* | (2018.01) | |
| *H04N 7/01* | (2006.01) | |
| *H04N 13/172* | (2018.01) | |
| *H04N 7/08* | (2006.01) | |
| *H04N 19/597* | (2014.01) | |
| *H04N 13/156* | (2018.01) | |
| *H04N 19/33* | (2014.01) | |
| *H04N 19/167* | (2014.01) | |
| *H04N 7/025* | (2006.01) | |

(52) U.S. Cl.
CPC ......... *H04N 13/194* (2018.05); *H04N 7/0102* (2013.01); *H04N 7/025* (2013.01); *H04N 7/08* (2013.01); *H04N 13/156* (2018.05); *H04N 13/172* (2018.05); *H04N 19/167* (2014.11); *H04N 19/33* (2014.11); *H04N 19/597* (2014.11)

(58) Field of Classification Search
CPC .... H04N 13/194; H04N 7/025; H04N 19/167; H04N 7/08; H04N 7/0102; H04N 19/597; H04N 13/156; H04N 13/172; H04N 19/33
See application file for complete search history.

(56) References Cited

U.S. PATENT DOCUMENTS

| | | | | |
|---|---|---|---|---|
| 2013/0322524 A1* | 12/2013 | Jang | ...................... | H04N 19/30 375/240.03 |
| 2017/0118540 A1* | 4/2017 | Thomas | ............. | H04N 21/2343 |
| 2018/0249163 A1* | 8/2018 | Curcio | ................. | H04N 19/137 |
| 2020/0084516 A1* | 3/2020 | Yun | ...................... | H04N 21/816 |

* cited by examiner

*Primary Examiner* — Nasim N Nirjhar
(74) *Attorney, Agent, or Firm* — Dentons US LLP

(57) ABSTRACT

A control method for a VR device is disclosed, which comprises the steps of receiving 360-degree video bitstreams, extracting sub-bitstreams included in the 360-degree video bitstreams, the sub-bitstreams including a Region of Interest (ROI) for the 360-degree video bitstreams, generating restoration data for the ROI from sub-bitstreams, and generating thumbnail data by remapping the restoration data for the ROI based on signaling information.

18 Claims, 35 Drawing Sheets

FIG. 7
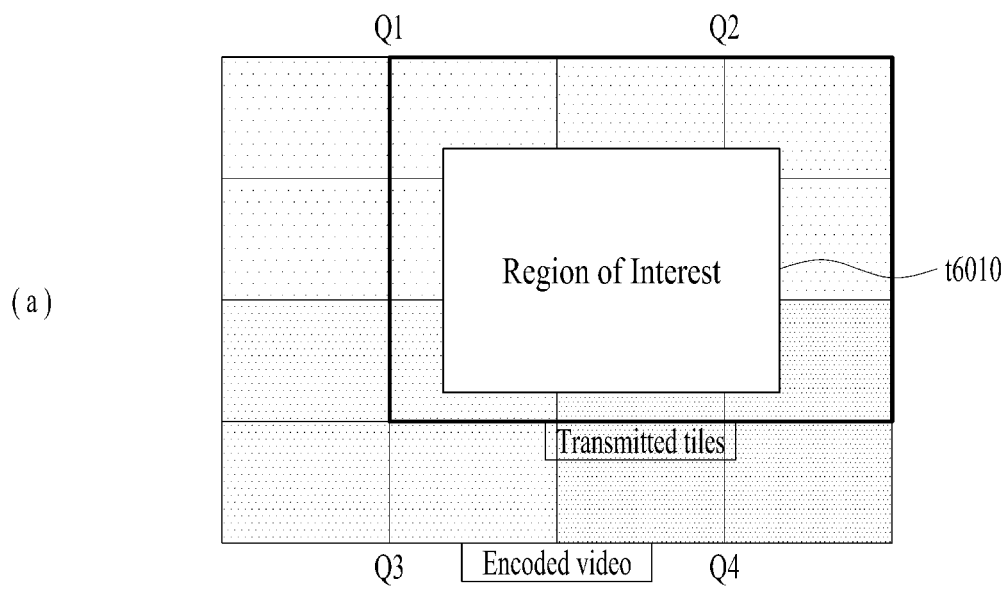
(a)
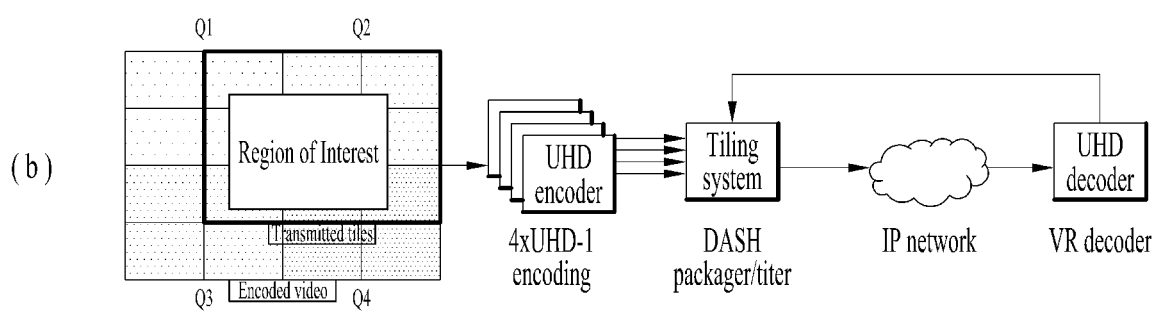
(b)

FIG. 8

```
 .....
        <basic metadata>
unsigned    int(8)          vr_geometry;
unsigned    int(8)          projection_schme;
        <stereoscopic-related metadata>
unsigned    int(1)          is_stereoscopic;
unsigned    int(3)          stereo_mode;
        <initial-view-related metadata>
signed      int(8)          initial_view_yaw_degree;
signed      int(8)          initial_view_pitch_degree;
signed      int(8)          initial_view_roll_degree;
        <ROI-related metadata>
unsigned int(1)             2d_roi_range_flag;
unsigned int(1)             3d_roi_range_flag;
if (2d_ROI_region_flag ==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_ROI_region_flag ==1) {
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <field-of-view-related metadata>
unsigned int(1)             content_fov_flag;
if (content_fov_flag == 1) {
  unsigned int(16)          content_fov;
}
        <cropped-region-related metadata>
unsigned int(1)             is_cropped_region;
if(is_cropped_region == 1) {
  unsigned int(16)          cr_region_left_top_x;
  unsigned int(16)          cr_region_left_top_y;
  unsigned int(16)          cr_region_width;
  unsigned int(16)          cr_region_height;
}
 .....
```

(a) viewpoint  (b) viewing position  (c) viewing orientation

FIG. 26
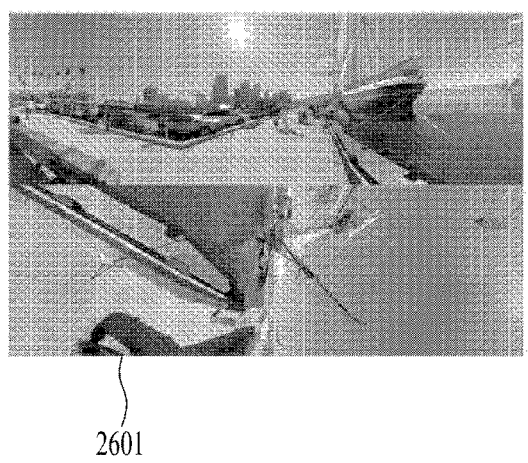
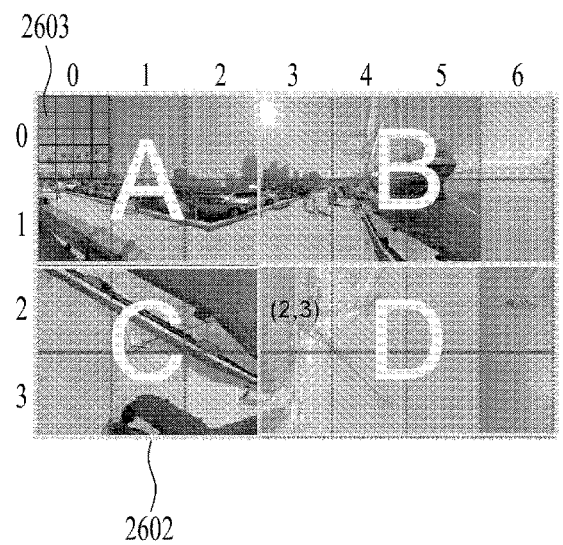

FIG. 31

```
Aligned (8) class viewportBox extends FullBox('vwpt', version=0, flag=0) {
    if (have_tile_information = = 0) {
        unsigned int(32) num_tile_columns;
        unsigned int(32) num_tile_rows;
    }
    for (i=0; i<num_tile_rows; i++) {
        for (j=0; j<num_tile_columns; j++) {
            bit(1) viewport_tile[i][j];
        }
    }
}
```

FIG. 32

| Element Name | Level | EBML ID | Ma | Mu | Rng | Element type | |
|---|---|---|---|---|---|---|---|
| Segment | 0 | [18][53][80][67] | Mand | - | - | m | |
| Tracks | 1 | [16][54][AE][6B] | - | Mult | - | m | |
| viewport | 2 | [88][D0] | - | - | - | m | |
| numTileColumns | 3 | [88][D1] | - | - | - | u | |
| numTileRows | 3 | [88][D2] | - | - | - | u | |
| TileViewport | 3 | [88][D3] | - | Mult | 0-1 | b | |
| TrackEntry | 2 | [AE] | Mand | Mult | - | m | |
| TrackNumber | 3 | [D7] | Mand | - | Not 0 | u | |

FIG. 33

| syntax | No. of bits | Mnemonic |
|---|---|---|
| Viewport_descriptor() { | | |
|   descriptor_tag | 8 | uimsbf |
|   descriptor_length | 8 | uimsbf |
|   num_tile_rows | 8 | uimsbf |
|   num_tile_columns | 8 | uimsbf |
|   for (i=0; i<num_tile_rows; i++) { | | |
|     for (j=0; j<num_tile_columns; j++) { | | |
|       viewport_tile[i][j]; | 1 | bslbf |
|     } | | |
|   } | | |
| } | | |

VR DEVICE AND CONTROL METHOD FOR THE SAME

This application claims the benefit of the Korean Patent Application No. 10-2019-0100315, filed on Aug. 16, 2019, which is hereby incorporated by reference as if fully set forth herein.

BACKGROUND OF THE INVENTION

Field of the Invention

The present invention relates to a VR device.

Discussion of the Related Art

A virtual reality (VR) system provides a user with sensory experiences through which the user may feel as if he/she were in an electronically projected environment. A system for providing VR may be further improved in order to provide higher-quality images and spatial sound. Such a VR system may enable the user to interactively enjoy VR contents.

SUMMARY OF THE INVENTION

Accordingly, the present invention is directed to a VR device and a control method for the same, which substantially obviate one or more problems due to limitations and disadvantages of the related art.

An object of the present invention is to provide a VR device and a VR device control method capable of greatly reducing the memory, transmission bandwidth, and time required to process a VR 360 image in extracting thumbnails of the VR 360 image.

Also, an object of the present invention is to provide to provide a VR device and a VR device control method capable of handling an immediate response to a viewer's fast view movement.

Moreover, an object of the present invention is to provide a VR device and a VR device control method without a video disconnection of the viewer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein.

According to the present invention, 360-degree contents can efficiently be transmitted in an environment in which next-generation hybrid broadcasting using terrestrial broadcast networks and Internet networks is supported.

According to the present invention, a method for providing interactive experience can be proposed for user's consumption of 360-degree contents.

According to the present invention, a signaling method for correctly reflecting the intention of a 360-degree contents producer can be proposed in user's consumption of 360-degree contents.

According to the present invention, a method for efficiently increasing transmission capacity and delivering necessary information can be proposed in delivery of 360-degree contents.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a view showing a tile according to an embodiment of the present invention;

FIG. 8 is a view showing 360-degree-video-related metadata according to an embodiment of the present invention;

FIG. 26 shows an example of ROT which will be used as a thumbnail during encoding of a tile basis according to some embodiments of the present invention.

FIG. 31 shows an embodiment of a format for storing ROI information and signaling information by using the MP4 standard in the VR device according to some embodiments of the present invention.

FIG. 32 shows an embodiment of a format for storing ROI information and signaling information by using Matroska format in the VR device according to some embodiments of the present invention.

FIG. 33 shows an embodiment of storage and signaling for ROI information by using MPEG-TS format.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood according to the intended meanings of the terms rather than their simple names or meanings.

Figure 1:
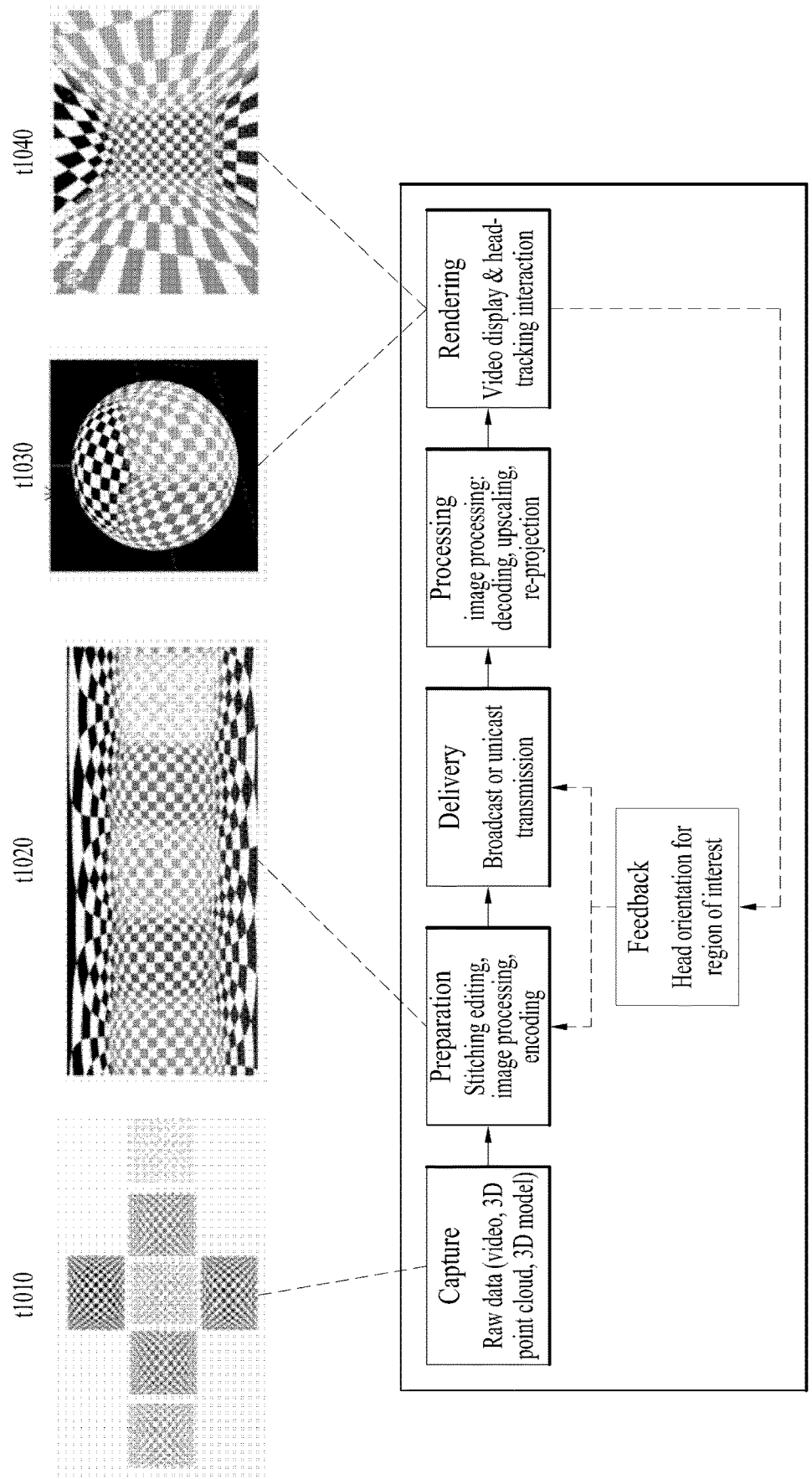
FIG. 1 is a view showing the entire architecture for providing a 360-degree video according to the present invention.

FIG. 1 is a view showing the entire architecture for providing 360-degree video according to the present invention.

The present invention proposes a scheme for 360-degree content provision in order to provide a user with virtual reality (VR). VR may mean technology or an environment for replicating an actual or virtual environment. VR artificially provides a user with sensual experiences through which the user may feel as if he/she were in an electronically projected environment.

360-degree content means all content for realizing and providing VR, and may include 360-degree video and/or 360-degree audio. The term "360-degree video" may mean video or image content that is captured or reproduced in all directions (360 degrees) at the same time, which is necessary to provide VR. Such 360-degree video may be a video or an image that appears in various kinds of 3D spaces depending on 3D models. For example, the 360-degree video may appear on a spherical surface. The term "360-degree audio", which is audio content for providing VR, may mean spatial audio content in which the origin of a sound is recognized as being located in a specific 3D space. The 360-degree content may be generated, processed, and transmitted to users, who may enjoy a VR experience using the 360-degree content.

The present invention proposes a method of effectively providing 360-degree video in particular. In order to provide 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capturing process may be a process of capturing an image or a video at each of a plurality of viewpoints using at least one camera. At the capturing process, image/video data may be generated, as shown (t1010). Each plane that is shown (t1010) may mean an image/video at each viewpoint. A plurality of captured images/videos may be raw data. At the capturing process, capturing-related metadata may be generated.

A special camera for VR may be used for capturing. In some embodiments, in the case in which 360-degree video for a virtual space generated by a computer is provided, capturing may not be performed using an actual camera. In this case, a process of simply generating related data may replace the capturing process.

The preparation process may be a process of processing the captured images/videos and the metadata generated at the capturing process. At the preparation process, the captured images/videos may undergo a stitching process, a projection process, a region-wise packing process, and/or an encoding process.

First, each image/video may undergo the stitching process. The stitching process may be a process of connecting the captured images/videos to generate a panoramic image/video or a spherical image/video.

Subsequently, the stitched image/video may undergo the projection process. At the projection process, the stitched image/video may be projected on a 2D image. Depending on the context, the 2D image may be called a 2D image frame. 2D image projection may be expressed as 2D image mapping. The projected image/video data may have the form of a 2D image, as shown (t1020).

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, this process may include a process of rotating each region or rearranging the regions on the 2D image in order to improve video coding efficiency. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata related to stitching/projection/encoding/editing may be generated in the same manner. In addition, metadata related to the initial viewpoint of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case in which the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form that is shown (t1030). The image/video is re-projected on a spherical 3D model, as shown (t1030). The user may view a portion of the rendered image/video through a VR display. At this time, the portion of the image/video that is viewed by the user may have the form that is shown (t1040).

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side at the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed at the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used at the reception side. That is, the decoding, re-projection, and rendering processes may be performed at the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewpoint, which is the point in the 360-degree video that is being viewed by the user, may be the very center of the viewport area. That is, the viewport is an area based on the viewpoint. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

Figure 2:
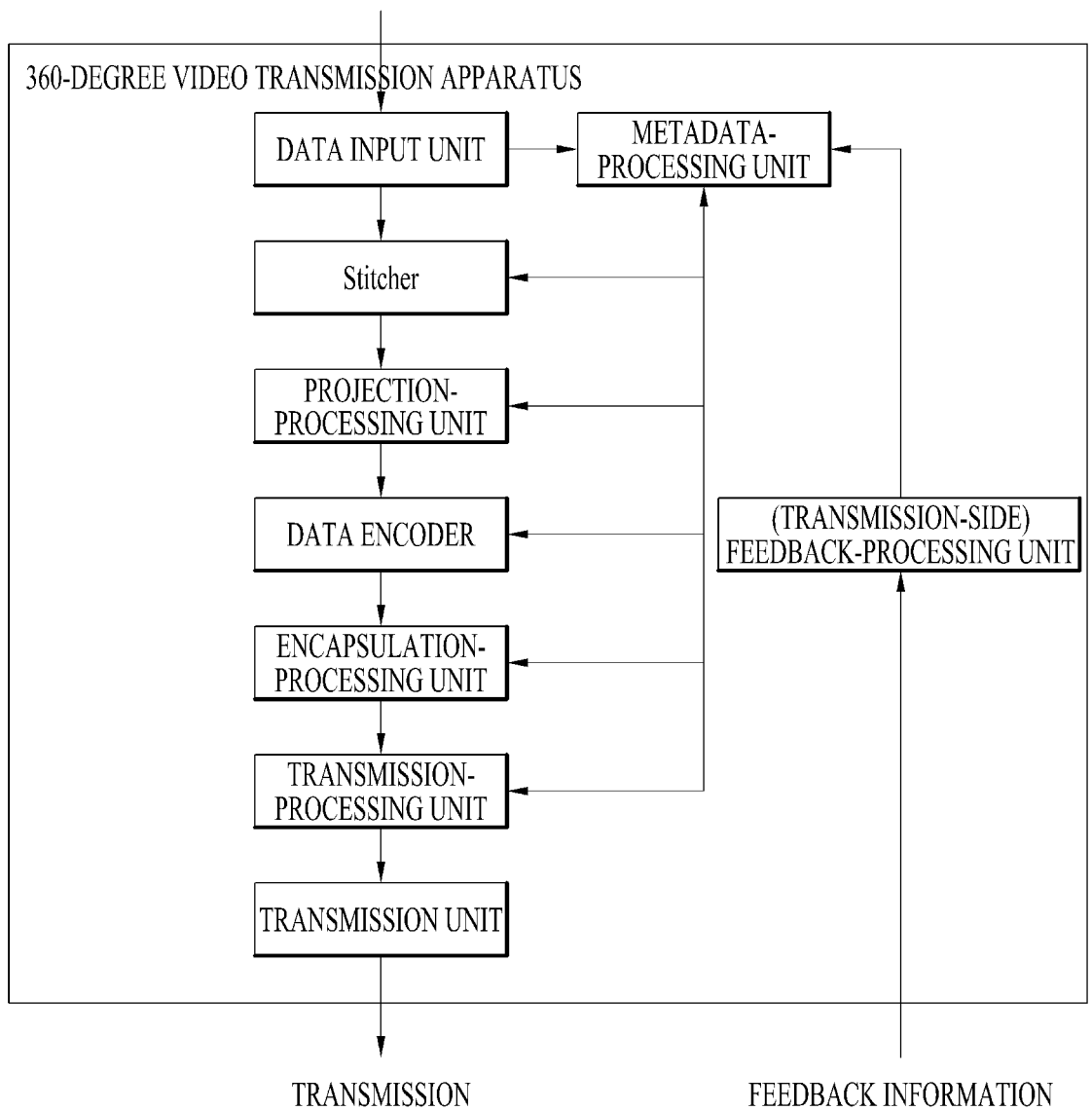
FIG. 2 is a view showing a 360-degree video transmission apparatus according to an aspect of the present invention.

FIG. 2 is a view showing a 360-degree video transmission apparatus according to an aspect of the present invention.

According to an aspect of the present invention, the present invention may be related to a 360-degree video transmission apparatus. The 360-degree video transmission apparatus according to the present invention may perform operations related to the preparation process and the delivery process. The 360-degree video transmission apparatus according to the present invention may include a data input unit, a stitcher, a projection-processor, a region-wise packing processor (not shown), a metadata-processor, a (transmission-side) feedback-processor, a data encoder, an encapsulation-processor, a transmission-processor, and/or a transmission unit as internal/external elements.

The data input unit may allow captured viewpoint-wise images/videos to be input. The viewpoint-wise image/videos may be images/videos captured using at least one camera. In addition, the data input unit may allow metadata generated at the capturing process to be input. The data input unit may deliver the input viewpoint-wise images/videos to the stitcher, and may deliver the metadata generated at the capturing process to a signaling processor.

The stitcher may stitch the captured viewpoint-wise images/videos. The stitcher may deliver the stitched 360-degree video data to the projection-processor. As needed, the stitcher may receive necessary metadata from the metadata-processor in order to use the received metadata at the stitching process. The stitcher may deliver metadata generated at the stitching process to the metadata-processor. The metadata generated at the stitching process may include information about whether stitching has been performed and the stitching type.

The projection-processor may project the stitched 360-degree video data on a 2D image. The projection-processor may perform projection according to various schemes, which will be described below. The projection-processor may perform mapping in consideration of the depth of the viewpoint-wise 360-degree video data. As needed, the projection-processor may receive metadata necessary for projection from the metadata-processor in order to use the received metadata for projection. The projection-processor may deliver metadata generated at the projection process to the metadata-processor. The metadata of the projection-processor may include information about the kind of projection scheme.

The region-wise packing processor (not shown) may perform the region-wise packing process. That is, the region-wise packing processor may divide the projected 360-degree video data into regions, and may rotate or re-arrange each region, or may change the resolution of each region. As previously described, the region-wise packing process is optional. In the case in which the region-wise packing process is not performed, the region-wise packing processor may be omitted. As needed, the region-wise packing processor may receive metadata necessary for region-wise packing from the metadata-processor in order to use the received metadata for region-wise packing. The region-wise packing processor may deliver metadata generated at the region-wise packing process to the metadata-processor. The metadata of the region-wise packing processor may include the extent of rotation and the size of each region.

In some embodiments, the stitcher, the projection-processor, and/or the region-wise packing processor may be incorporated into a single hardware component.

The metadata-processor may process metadata that may be generated at the capturing process, the stitching process, the projection process, the region-wise packing process, the encoding process, the encapsulation process, and/or the processing process for delivery. The metadata-processor may generate 360-degree-video-related metadata using the above-mentioned metadata. In some embodiments, the metadata-processor may generate the 360-degree-video-related metadata in the form of a signaling table. Depending on the context of signaling, the 360-degree-video-related metadata may be called metadata or signaling information related to the 360-degree video. In addition, the metadata-processor may deliver the acquired or generated metadata to the internal elements of the 360-degree video transmission apparatus, as needed. The metadata-processor may deliver the 360-degree-video-related metadata to the data encoder, the encapsulation-processor, and/or the transmission-processor such that the 360-degree-video-related metadata can be transmitted to the reception side.

The data encoder may encode the 360-degree video data projected on the 2D image and/or the region-wise packed 360-degree video data. The 360-degree video data may be encoded in various formats.

The encapsulation-processor may encapsulate the encoded 360-degree video data and/or the 360-degree-video-related metadata in the form of a file. Here, the 360-degree-video-related metadata may be metadata received from the metadata-processor. The encapsulation-processor may encapsulate the data in a file format of ISOBMFF or CFF, or may process the data in the form of a DASH segment. In some embodiments, the encapsulation-processor may include the 360-degree-video-related metadata on the file format. For example, the 360-degree-video-related metadata may be included in various levels of boxes in the ISOBMFF file format, or may be included as data in a separate track within the file. In some embodiments, the encapsulation-processor may encapsulate the 360-degree-video-related metadata itself as a file. The transmission-processor may perform processing for transmission on the encapsulated 360-degree video data according to the file format. The transmission-processor may process the 360-degree video data according to an arbitrary transport protocol. Processing for transmission may include processing for delivery through a broadcast network and processing for delivery through a broadband connection. In some embodiments, the transmission-processor may receive 360-degree-video-related metadata from the metadata-processor, in addition to the 360-degree video data, and may perform processing for transmission thereon.

The transmission unit may transmit the transmission-processed 360-degree video data and/or the 360-degree-video-related metadata through the broadcast network and/or the broadband connection. The transmission unit may include an element for transmission through the broadcast network and/or an element for transmission through the broadband connection.

In an embodiment of the 360-degree video transmission apparatus according to the present invention, the 360-degree video transmission apparatus may further include a data storage unit (not shown) as an internal/external element. The data storage unit may store the encoded 360-degree video data and/or the 360-degree-video-related metadata before delivery to the transmission-processor. The data may be stored in a file format of ISOBMFF. In the case in which the 360-degree video is transmitted in real time, no data storage unit is needed. In the case in which the 360-degree video is transmitted on demand, in non-real time (NRT), or through a broadband connection, however, the encapsulated 360-degree data may be transmitted after being stored in the data storage unit for a predetermined period of time.

In another embodiment of the 360-degree video transmission apparatus according to the present invention, the 360-degree video transmission apparatus may further include a (transmission-side) feedback-processor and/or a network interface (not shown) as an internal/external element. The network interface may receive feedback information from a 360-degree video reception apparatus according to the present invention, and may deliver the received feedback information to the transmission-side feedback-processor. The transmission-side feedback-processor may deliver the feedback information to the stitcher, the projection-processor, the region-wise packing processor, the data encoder, the encapsulation-processor, the metadata-processor, and/or the transmission-processor. In some embodiments, the feedback information may be delivered to the metadata-processor, and may then be delivered to the respective internal elements. After receiving the feedback information, the internal elements may reflect the feedback information when subsequently processing the 360-degree video data.

In another embodiment of the 360-degree video transmission apparatus according to the present invention, the region-wise packing processor may rotate each region, and may map the rotated region on the 2D image. At this time, the regions may be rotated in different directions and at different angles, and may be mapped on the 2D image. The rotation of the regions may be performed in consideration of the portions of the 360-degree video data that were adjacent to each other on the spherical surface before projection and the stitched portions thereof. Information about the rotation of the regions, i.e. the rotational direction and the rotational angle, may be signaled by the 360-degree-video-related metadata. In another embodiment of the 360-degree video transmission apparatus according to the present invention, the data encoder may differently encode the regions. The data encoder may encode some regions at high quality, and may encode some regions at low quality. The transmission-side feedback-processor may deliver the feedback information, received from the 360-degree video reception apparatus, to the data encoder, which may differently encode the regions. For example, the transmission-side feedback-processor may deliver the viewport information, received from the reception side, to the data encoder. The data encoder may encode regions including the areas indicated by the viewport information at higher quality (UHD, etc.) than other regions.

In a further embodiment of the 360-degree video transmission apparatus according to the present invention, the transmission-processor may differently perform processing for transmission on the regions. The transmission-processor may apply different transport parameters (modulation order, code rate, etc.) to the regions such that robustness of data delivered for each region is changed.

At this time, the transmission-side feedback-processor may deliver the feedback information, received from the 360-degree video reception apparatus, to the transmission-processor, which may differently perform transmission processing for the regions. For example, the transmission-side feedback-processor may deliver the viewport information, received from the reception side, to the transmission-processor. The transmission-processor may perform transmission processing on regions including the areas indicated by the viewport information so as to have higher robustness than other regions.

The internal/external elements of the 360-degree video transmission apparatus according to the present invention may be hardware elements that are realized as hardware. In some embodiments, however, the internal/external elements may be changed, omitted, replaced, or incorporated. In some embodiments, additional elements may be added to the 360-degree video transmission apparatus.

Figure 3:
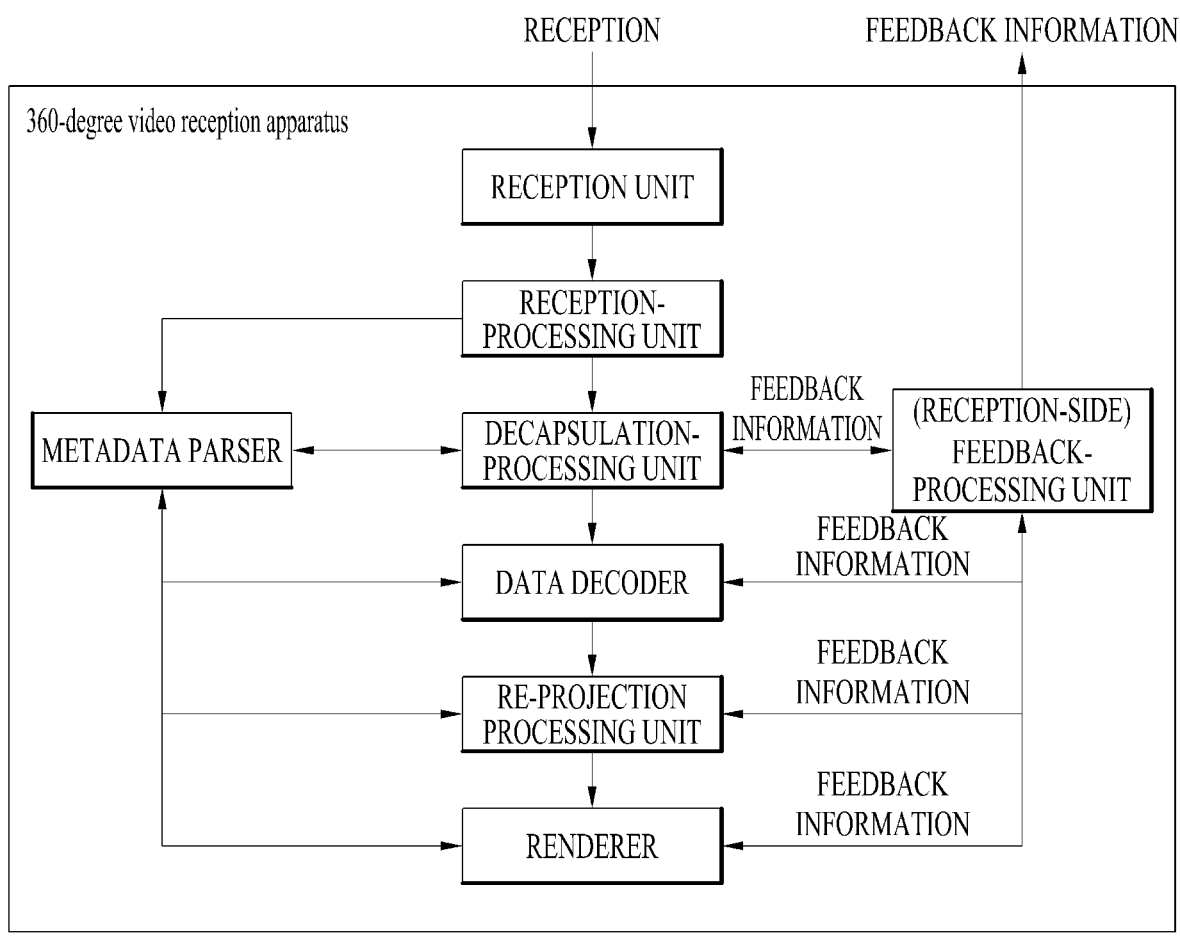
FIG. 3 is a view showing a 360-degree video reception apparatus according to another aspect of the present invention.

FIG. 3 is a view showing a 360-degree video reception apparatus according to another aspect of the present invention.

According to another aspect of the present invention, the present invention may be related to a 360-degree video reception apparatus. The 360-degree video reception apparatus according to the present invention may perform operations related to the processing process and/or the rendering process. The 360-degree video reception apparatus according to the present invention may include a reception unit, a reception-processor, a decapsulation-processor, a data decoder, a metadata parser, a (reception-side) feedback-processor, a re-projection processor, and/or a renderer as internal/external elements.

The reception unit may receive 360-degree video data transmitted by the 360-degree video transmission apparatus. Depending on the channel through which the 360-degree video data are transmitted, the reception unit may receive the 360-degree video data through a broadcast network, or may receive the 360-degree video data through a broadband connection.

The reception-processor may process the received 360-degree video data according to a transport protocol. In order to correspond to processing for transmission at the transmission side, the reception-processor may perform the reverse process of the transmission-processor. The reception-processor may deliver the acquired 360-degree video data to the decapsulation-processor, and may deliver the acquired 360-degree-video-related metadata to the metadata parser. The 360-degree-video-related metadata, acquired by the reception-processor, may have the form of a signaling table.

The decapsulation-processor may decapsulate the 360-degree video data, received in file form from the reception-processor. The decapsulation-processor may decapsulate the files based on ISOBMFF, etc. to acquire 360-degree video data and 360-degree-video-related metadata. The acquired 360-degree video data may be delivered to the data decoder, and the acquired 360-degree-video-related metadata may be delivered to the metadata parser. The 360-degree-video-related metadata, acquired by the decapsulation-processor, may have the form of a box or a track in a file format. As needed, the decapsulation-processor may receive metadata necessary for decapsulation from the metadata parser.

The data decoder may decode the 360-degree video data. The data decoder may receive metadata necessary for decoding from the metadata parser. The 360-degree-video-related metadata, acquired at the data decoding process, may be delivered to the metadata parser.

The metadata parser may parse/decode the 360-degree-video-related metadata. The metadata parser may deliver the acquired metadata to the decapsulation-processor, the data decoder, the re-projection processor, and/or the renderer.

The re-projection processor may re-project the decoded 360-degree video data. The re-projection processor may re-project the 360-degree video data in a 3D space. The 3D space may have different forms depending on the 3D models that are used. The re-projection processor may receive metadata for re-projection from the metadata parser. For example, the re-projection processor may receive information about the type of 3D model that is used and the details thereof from the metadata parser. In some embodiments, the re-projection processor may re-project, in the 3D space, only the portion of 360-degree video data that corresponds to a specific area in the 3D space using the metadata for re-projection.

The renderer may render the re-projected 360-degree video data. As previously described, the 360-degree video data may be expressed as being rendered in the 3D space. In the case in which two processes are performed simultaneously, the re-projection processor and the renderer may be incorporated such that the renderer can perform these processes. In some embodiments, the renderer may render only the portion that is being viewed by a user according to user's viewpoint information.

The user may view a portion of the rendered 360-degree video through a VR display. The VR display, which is a device that reproduces the 360-degree video, may be included in the 360-degree video reception apparatus (tethered), or may be connected to the 360-degree video reception apparatus (untethered).

In an embodiment of the 360-degree video reception apparatus according to the present invention, the 360-degree video reception apparatus may further include a (reception-side) feedback-processor and/or a network interface (not shown) as an internal/external element. The reception-side feedback-processor may acquire and process feedback information from the renderer, the re-projection processor, the data decoder, the decapsulation-processor, and/or the VR display. The feedback information may include viewport information, head orientation information, and gaze information. The network interface may receive the feedback information from the reception-side feedback-processor, and may transmit the same to the 360-degree video transmission apparatus.

As previously described, the feedback information may not only be delivered to the transmission side but may also be used at the reception side. The reception-side feedback-processor may deliver the acquired feedback information to the internal elements of the 360-degree video reception apparatus so as to be reflected at the rendering process. The reception-side feedback-processor may deliver the feedback information to the renderer, the re-projection processor, the data decoder, and/or the decapsulation-processor. For example, the renderer may first render the area that is being viewed by the user using the feedback information. In addition, the decapsulation-processor and the data decoder may first decapsulate and decode the area that is being viewed by the user or the area that will be viewed by the user.

The internal/external elements of the 360-degree video reception apparatus according to the present invention described above may be hardware elements that are realized as hardware. In some embodiments, the internal/external elements may be changed, omitted, replaced, or incorporated. In some embodiments, additional elements may be added to the 360-degree video reception apparatus.

According to another aspect of the present invention, the present invention may be related to a 360-degree video transmission method and a 360-degree video reception method. The 360-degree video transmission/reception method according to the present invention may be performed by the 360-degree video transmission/reception apparatus according to the present invention described above or embodiments of the apparatus.

Embodiments of the 360-degree video transmission/reception apparatus and transmission/reception method according to the present invention and embodiments of the internal/external elements thereof may be combined. For example, embodiments of the projection-processor and embodiments of the data encoder may be combined in order to provide a number of possible embodiments of the 360-degree video transmission apparatus. Such combined embodiments also fall within the scope of the present invention.

Figure 4:
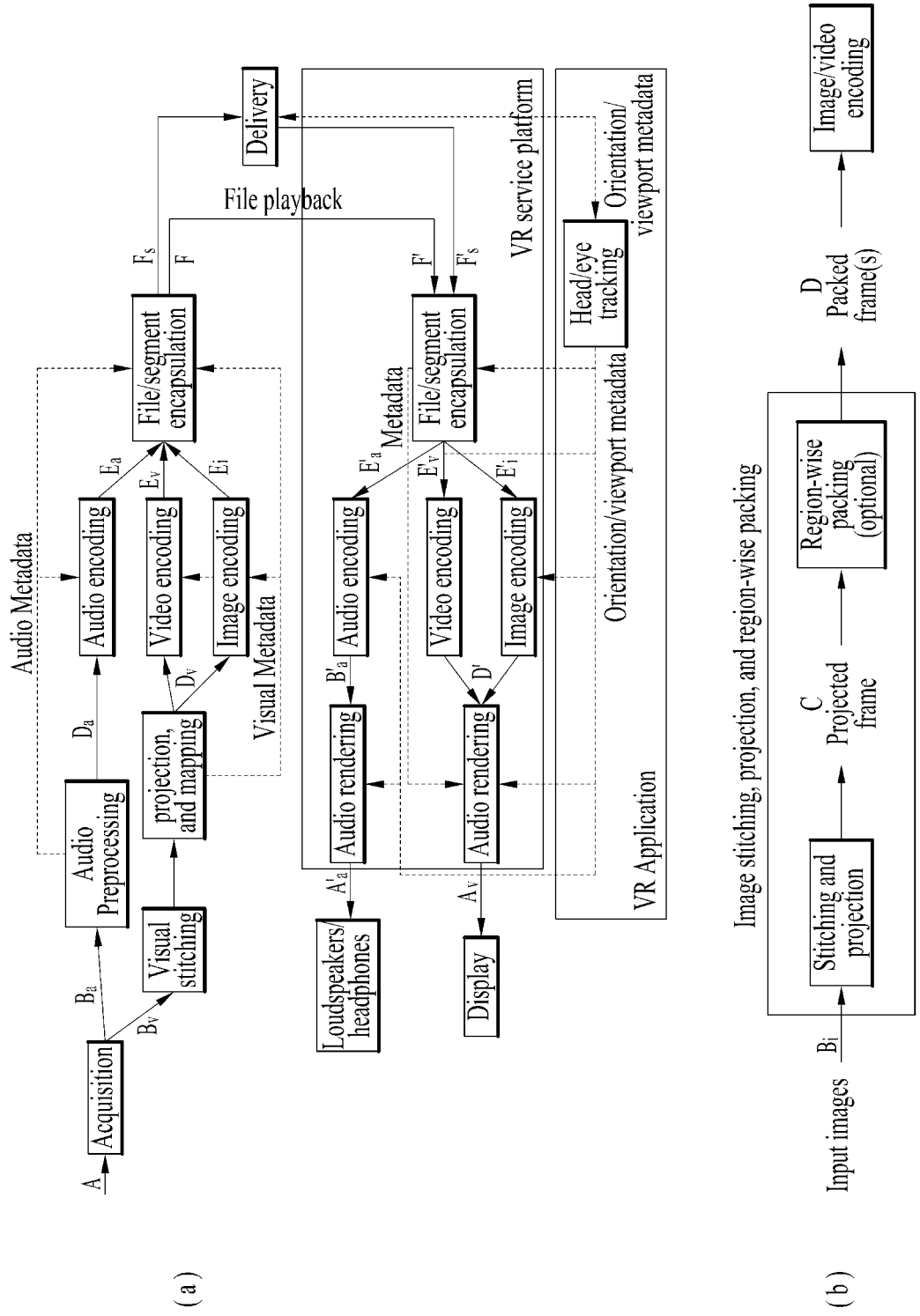
FIG. 4 is a view showing a 360-degree video transmission apparatus/360-degree video reception apparatus according to another embodiment of the present invention.

FIG. 4 is a view showing a 360-degree video transmission apparatus/360-degree video reception apparatus according to another embodiment of the present invention.

As previously described, 360-degree content may be provided through the architecture shown in FIG. 4(a). The 360-degree content may be provided in the form of a file, or may be provided in the form of segment-based download or streaming service, such as DASH. Here, the 360-degree content may be called VR content.

As previously described, 360-degree video data and/or 360-degree audio data may be acquired (Acquisition).

The 360-degree audio data may undergo an audio pre-processing process and an audio encoding process. In these processes, audio-related metadata may be generated. The encoded audio and the audio-related metadata may undergo processing for transmission (file/segment encapsulation).

The 360-degree video data may undergo the same processes as previously described. The stitcher of the 360-degree video transmission apparatus may perform stitching on the 360-degree video data (Visual stitching). In some embodiments, this process may be omitted, and may be performed at the reception side. The projection-processor of the 360-degree video transmission apparatus may project the 360-degree video data on a 2D image (Projection and mapping (packing)).

The stitching and projection processes are shown in detail in FIG. 4(b). As shown in FIG. 4(b), when the 360-degree video data (input image) is received, stitching and projection may be performed. Specifically, at the projection process, the stitched 360-degree video data may be projected in a 3D space, and the projected 360-degree video data may be arranged on the 2D image. In this specification, this process may be expressed as projecting the 360-degree video data on the 2D image. Here, the 3D space may be a sphere or a cube. The 3D space may be the same as the 3D space used for re-projection at the reception side.

The 2D image may be called a projected frame C. Region-wise packing may be selectively performed on the 2D image. When region-wise packing is performed, the position, shape, and size of each region may be indicated such that the regions on the 2D image can be mapped on a packed frame D. When region-wise packing is not performed, the projected frame may be the same as the packed frame. The regions will be described below. The projection process and the region-wise packing process may be expressed as projecting the regions of the 360-degree video data on the 2D image. Depending on the design, the 360-degree video data may be directly converted into the packed frame without undergoing intermediate processes.

As shown in FIG. 4(a), the projected 360-degree video data may be image-encoded or video-encoded. Since even the same content may have different viewpoints, the same content may be encoded in different bit streams. The encoded 360-degree video data may be processed in a file format of ISOBMFF by the encapsulation-processor. Alternatively, the encapsulation-processor may process the encoded 360-degree video data into segments. The segments may be included in individual tracks for transmission based on DASH.

When the 360-degree video data are processed, 360-degree-video-related metadata may be generated, as previously described. The metadata may be delivered while being included in a video stream or a file format. The metadata may also be used at the encoding process, file format encapsulation, or processing for transmission.

The 360-degree audio/video data may undergo processing for transmission according to the transport protocol, and may then be transmitted. The 360-degree video reception apparatus may receive the same through a broadcast network or a broadband connection.

In FIG. 4(a), a VR service platform may correspond to one embodiment of the 360-degree video reception apparatus. In FIG. 4(a), Loudspeaker/headphone, display, and head/eye tracking components are shown as being performed by an external device of the 360-degree video reception apparatus or VR application. In some embodiments, the 360-degree video reception apparatus may include these components. In some embodiments, the head/eye tracking component may correspond to the reception-side feedback-processor.

The 360-degree video reception apparatus may perform file/segment decapsulation for reception on the 360-degree audio/video data. The 360-degree audio data may undergo audio decoding and audio rendering, and may then be provided to a user through the loudspeaker/headphone component.

The 360-degree video data may undergo image decoding or video decoding and visual rendering, and may then be provided to the user through the display component. Here, the display component may be a display that supports VR or a general display.

As previously described, specifically, the rendering process may be expressed as re-projecting the 360-degree video data in the 3D space and rendering the re-projected 360-degree video data. This may also be expressed as rendering the 360-degree video data in the 3D space.

The head/eye tracking component may acquire and process head orientation information, gaze information, and viewport information of the user, which have been described previously.

A VR application that communicates with the reception-side processes may be provided at the reception side.

Figure 5:
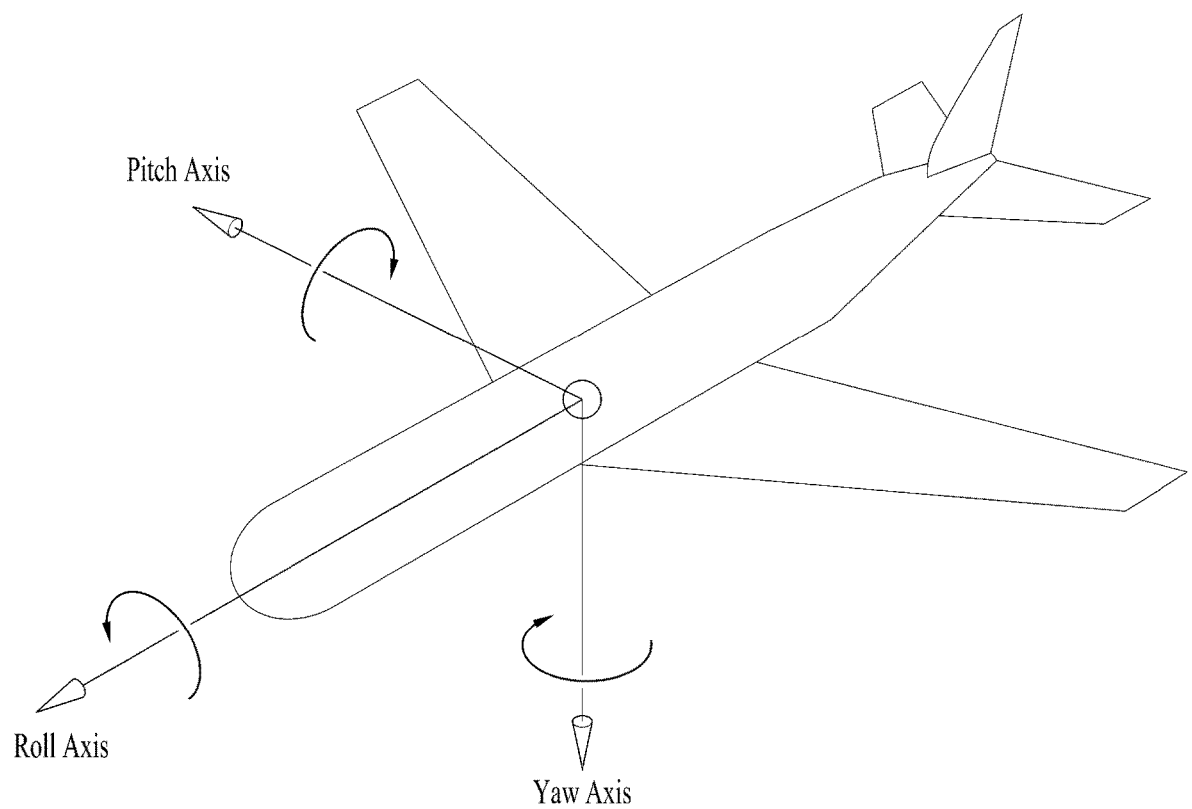
FIG. 5 is a view showing the concept of principal aircraft axes for describing 3D space in connection with the present invention.

FIG. 5 is a view showing the concept of principal aircraft axes for describing 3D space in connection with the present invention.

In the present invention, the concept of principal aircraft axes may be used in order to express a specific point, position, direction, distance, area, etc. in the 3D space.

That is, in the present invention, the 3D space before projection or after re-projection may be described, and the concept of principal aircraft axes may be used in order to perform signaling thereon. In some embodiments, a method of using X, Y, and Z-axis concepts or a spherical coordinate system may be used.

An aircraft may freely rotate in three dimensions. Axes constituting the three dimensions are referred to as a pitch axis, a yaw axis, and a roll axis. In this specification, these terms may also be expressed either as pitch, yaw, and roll or as a pitch direction, a yaw direction, and a roll direction.

The pitch axis may be an axis about which the forward portion of the aircraft is rotated upwards/downwards. In the shown concept of principal aircraft axes, the pitch axis may be an axis extending from one wing to another wing of the aircraft.

The yaw axis may be an axis about which the forward portion of the aircraft is rotated leftwards/rightwards. In the shown concept of principal aircraft axes, the yaw axis may be an axis extending from the top to the bottom of the aircraft.

In the shown concept of principal aircraft axes, the roll axis may be an axis extending from the forward portion to the tail of the aircraft. Rotation in the roll direction may be rotation performed about the roll axis.

As previously described, the 3D space in the present invention may be described using the pitch, yaw, and roll concept.

Figure 6:
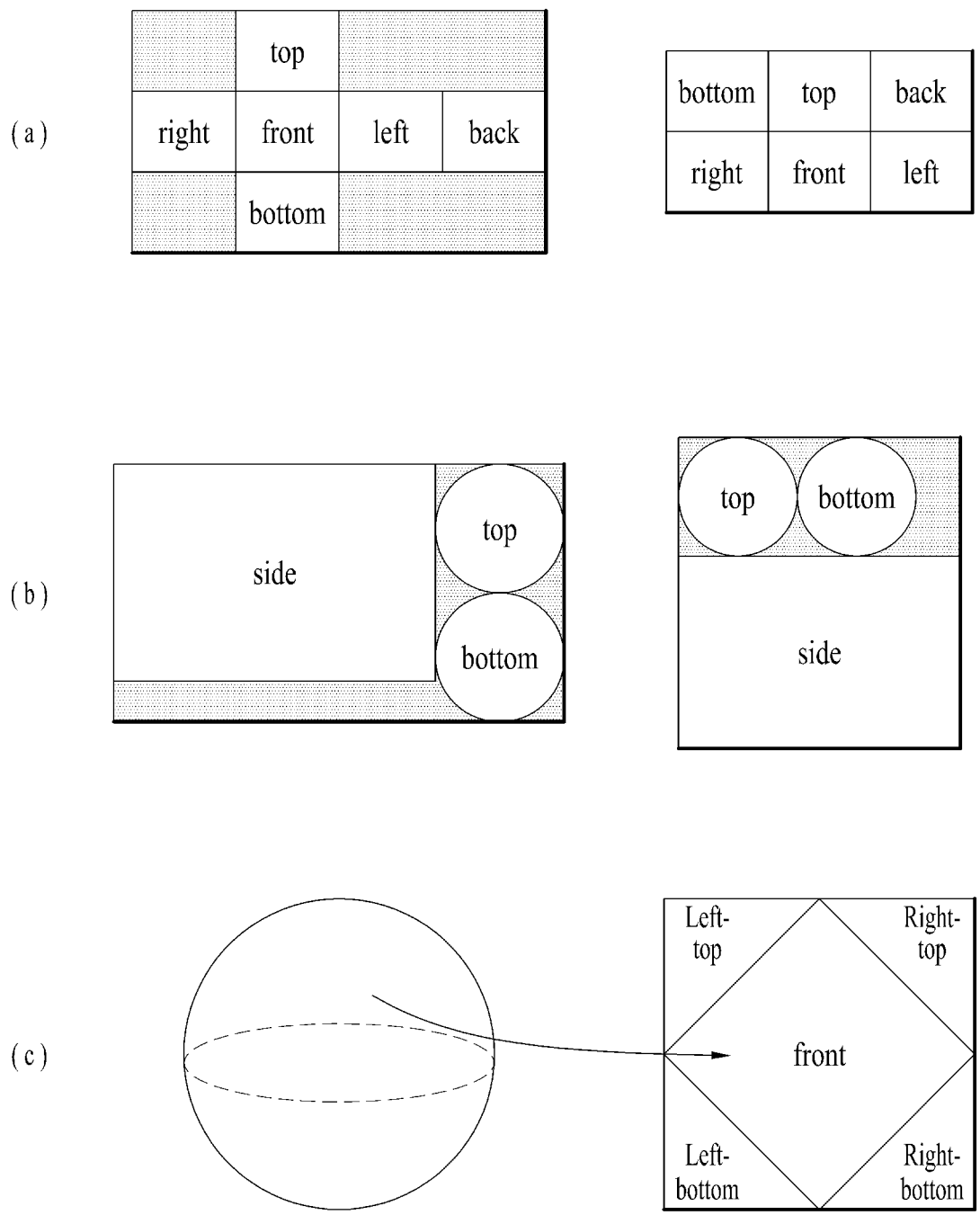
FIG. 6 is a view showing projection schemes according to an embodiment of the present invention.

FIG. 6 is a view showing projection schemes according to an embodiment of the present invention.

As previously described, the projection-processor of the 360-degree video transmission apparatus according to the present invention may project the stitched 360-degree video data on the 2D image. In this process, various projection schemes may be used.

In another embodiment of the 360-degree video transmission apparatus according to the present invention, the projection-processor may perform projection using a cubic projection scheme. For example, the stitched 360-degree video data may appear on a spherical surface. The projection-processor may project the 360-degree video data on the 2D image in the form of a cube. The 360-degree video data on the spherical surface may correspond to respective surfaces of the cube. As a result, the 360-degree video data may be projected on the 2D image, as shown at the left side or the right side of FIG. 6(a).

In another embodiment of the 360-degree video transmission apparatus according to the present invention, the projection-processor may perform projection using a cylindrical projection scheme. In the same manner, on the assumption that the stitched 360-degree video data appear on a spherical surface, the projection-processor may project the 360-degree video data on the 2D image in the form of a cylinder. The 360-degree video data on the spherical surface may correspond to the side, the top, and the bottom of the cylinder. As a result, the 360-degree video data may be projected on the 2D image, as shown at the left side or the right side of FIG. 6(b).

In a further embodiment of the 360-degree video transmission apparatus according to the present invention, the projection-processor may perform projection using a pyramidal projection scheme. In the same manner, on the assumption that the stitched 360-degree video data appears on a spherical surface, the projection-processor may project the 360-degree video data on the 2D image in the form of a pyramid. The 360-degree video data on the spherical surface may correspond to the front, the left top, the left bottom, the right top, and the right bottom of the pyramid. As a result, the 360-degree video data may be projected on the 2D image, as shown at the left side or the right side of FIG. 6(c).

In some embodiments, the projection-processor may perform projection using an equirectangular projection scheme or a panoramic projection scheme, in addition to the above-mentioned schemes.

As previously described, the regions may be divided parts of the 2D image on which the 360-degree video data are projected. The regions do not necessarily coincide with respective surfaces on the 2D image projected according to the projection scheme. In some embodiments, however, the regions may be partitioned so as to correspond to the projected surfaces on the 2D image such that region-wise packing can be performed. In some embodiments, a plurality of surfaces may correspond to a single region, and a single surface corresponds to a plurality of regions. In this case, the regions may be changed depending on the projection scheme. For example, in FIG. 6(a), the respective surfaces (top, bottom, front, left, right, and back) of the cube may be respective regions. In FIG. 6(b), the side, the top, and the bottom of the cylinder may be respective regions. In FIG. 6(c), the front and the four-directional lateral surfaces (left top, left bottom, right top, and right bottom) of the pyramid may be respective regions.

FIG. 7 is a view showing a tile according to an embodiment of the present invention.

The 360-degree video data projected on the 2D image or the 360-degree video data that have undergone region-wise packing may be partitioned into one or more tiles. FIG. 7(a) shows a 2D image divided into 16 tiles. Here, the 2D image may be the projected frame or the packed frame. In another embodiment of the 360-degree video transmission apparatus according to the present invention, the data encoder may independently encode the tiles.

Region-wise packing and tiling may be different from each other. Region-wise packing may be processing each region of the 360-degree video data projected on the 2D image in order to improve coding efficiency or to adjust resolution. Tiling may be the data encoder dividing the projected frame or the packed frame into tiles and independently encoding the tiles. When the 360-degree video data are provided, the user does not simultaneously enjoy all parts of the 360-degree video data. Tiling may enable the user to enjoy or transmit only tiles corresponding to an important part or a predetermined part, such as the viewport that is being viewed by the user, to the reception side within a limited bandwidth. The limited bandwidth may be more efficiently utilized through tiling, and calculation load may be reduced because the reception side does not process the entire 360-degree video data at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case in which the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360-degree content provider. The 360-degree content provider may produce a 360-degree video in consideration of the area of the 360-degree video in which users are interested. In some embodiments, the ROI may correspond to an area of the 360-degree video in which an important portion of the 360-degree video is shown.

In another embodiment of the 360-degree video transmission/reception apparatus according to the present invention, the reception-side feedback-processor may extract and collect viewport information, and may deliver the same to the transmission-side feedback-processor. At this process, the viewport information may be delivered using the network interfaces of both sides. FIG. 7(a) shows a viewport t6010 displayed on the 2D image. Here, the viewport may be located over 9 tiles on the 2D image.

In this case, the 360-degree video transmission apparatus may further include a tiling system. In some embodiments, the tiling system may be disposed after the data encoder (see FIG. 7(b)), may be included in the data encoder or the transmission-processor, or may be included in the 360-degree video transmission apparatus as a separate internal/external element.

The tiling system may receive the viewport information from the transmission-side feedback-processor. The tiling system may select and transmit only tiles including the viewport area. In the FIG. 7(a), 9 tiles including the viewport area t6010, among a total of 16 tiles of the 2D image, may be transmitted. Here, the tiling system may transmit the tiles in a unicast manner over a broadband connection. The reason for this is that the viewport area may be changed for respective people.

Also, in this case, the transmission-side feedback-processor may deliver the viewport information to the data encoder. The data encoder may encode the tiles including the viewport area at higher quality than other tiles.

Also, in this case, the transmission-side feedback-processor may deliver the viewport information to the metadata-processor. The metadata-processor may deliver metadata related to the viewport area to the internal elements of the 360-degree video transmission apparatus, or may include the same in the 360-degree-video-related metadata.

By using this tiling system, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360-degree video through the VR display (initial viewpoint).

In another embodiment of the 360-degree video transmission apparatus according to the present invention, the transmission-processor may perform transmission processing differently for respective tiles. The transmission-processor may apply different transport parameters (modulation order, code rate, etc.) to the tiles such that robustness of data delivered for each region is changed.

At this time, the transmission-side feedback-processor may deliver the feedback information, received from the 360-degree video reception apparatus, to the transmission-processor, which may perform transmission processing differently for respective tiles. For example, the transmission-side feedback-processor may deliver the viewport information, received from the reception side, to the transmission-processor. The transmission-processor may perform transmission processing on tiles including the viewport area so as to have higher robustness than for the other tiles.

FIG. 8 is a view showing 360-degree-video-related metadata according to an embodiment of the present invention.

The 360-degree-video-related metadata may include various metadata for the 360-degree video. Depending on the context, the 360-degree-video-related metadata may be called 360-degree-video-related signaling information. The 360-degree-video-related metadata may be transmitted while being included in a separate signaling table, or may be transmitted while being included in DASH MPD, or may be transmitted while being included in the form of a box in a file format of ISOBMFF. In the case in which the 360-degree-video-related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

In an embodiment of the 360-degree-video-related metadata according to the present invention, the 360-degree-video-related metadata may include basic metadata about projection schemes, stereoscopy-related metadata, initial-view/initial-viewpoint-related metadata, ROI-related metadata, field-of-view (FOV)-related metadata, and/or cropped-region-related metadata. In some embodiments, the 360-degree-video-related metadata may further include metadata other than the above metadata.

Embodiments of the 360-degree-video-related metadata according to the present invention may include at least one of the basic metadata, the stereoscopy-related metadata, the initial-view-related metadata, the ROI-related metadata, the FOV-related metadata, the cropped-region-related metadata, and/or additional possible metadata. Embodiments of the 360-degree-video-related metadata according to the present invention may be variously configured depending on possible number of metadata included therein. In some embodiments, the 360-degree-video-related metadata may further include additional information.

The basic metadata may include 3D-model-related information and projection-scheme-related information. The basic metadata may include a vr_geometry field and a projection_scheme field. In some embodiments, the basic metadata may include additional information.

The vr_geometry field may indicate the type of 3D model supported by the 360-degree video data. In the case in which the 360-degree video data is re-projected in a 3D space, as previously described, the 3D space may have a form based on the 3D model indicated by the vr_geometry field. In some embodiments, a 3D model used for rendering may be different from a 3D model used for re-projection indicated by the vr_geometry field. In this case, the basic metadata may further include a field indicating the 3D model used for rendering. In the case in which the field has a value of 0, 1, 2, or 3, the 3D space may follow a 3D model of a sphere, a cube, a cylinder, or a pyramid. In the case in which the field has additional values, the values may be reserved for future use. In some embodiments, the 360-degree-video-related metadata may further include detailed information about the 3D model indicated by the field. Here, the detailed information about the 3D model may be radius information of the sphere or the height information of the cylinder. This field may be omitted.

The projection_scheme field may indicate the projection scheme used when the 360-degree video data is projected on a 2D image. In the case in which the field has a value of 0, 1, 2, 3, 4, or 5, this may indicate that an equirectangular projection scheme, a cubic projection scheme, a cylindrical projection scheme, a tile-based projection scheme, a pyramidal projection scheme, or a panoramic projection scheme has been used. In the case in which the field has a value of 6, this may indicate that the 360-degree video data has been projected on a 2D image without stitching. In the case in which the field has additional values, the values may be reserved for future use. In some embodiments, the 360-degree-video-related metadata may further include detailed information about regions generated by the projection scheme specified by the field. Here, the detailed information about the regions may be rotation of the regions or radius information of the top region of the cylinder.

The stereoscopy-related metadata may include information about 3D-related attributes of the 360-degree video data. The stereoscopy-related metadata may include an is_stereoscopic field and/or a stereo_mode field. In some embodiments, the stereoscopy-related metadata may further include additional information.

The is_stereoscopic field may indicate whether the 360-degree video data support 3D. When the field is 1, this may mean 3D support. When the field is 0, this may mean 3D non-support. This field may be omitted.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case in which the field has additional values, the values may be reserved for future use.

The initial-view-related metadata may include information about the time at which a user views the 360-degree video when the 360-degree video is reproduced first (an initial viewpoint). The initial-view-related metadata may include an initial_view_yaw_degree field, an initial_view_pitch_degree field, and/or an initial_view_roll_degree field. In some embodiments, the initial-view-related metadata may further include additional information.

The initial_view_yaw_degree field, the initial_view_pitch_degree field, and the initial_view_roll_degree field may indicate an initial viewpoint when the 360-degree video is reproduced. That is, the very center point of the viewport that is viewed first at the time of reproduction may be indicated by these three fields. The fields may indicate the position of the right center point as the rotational direction (symbol) and the extent of rotation (angle) about the yaw, pitch, and roll axes. At this time, the viewport that is viewed when the video is reproduced first according to the FOV may be determined. The horizontal length and the vertical length (width and height) of an initial viewport based on the indicated initial viewpoint through the FOV may be determined. That is, the 360-degree video reception apparatus may provide a user with a predetermined area of the 360-degree video as an initial viewport using these three fields and the FOV information.

In some embodiments, the initial viewpoint indicated by the initial-view-related metadata may be changed for each scene. That is, the scenes of the 360-degree video may be changed over time. An initial viewpoint or an initial viewport at which the user views the video first may be changed for every scene of the 360-degree video. In this case, the initial-view-related metadata may indicate the initial viewport for each scene. To this end, the initial-view-related metadata may further include a scene identifier identifying the scene to which the initial viewpoint is applied. In addition, the FOV may be changed for each scene. The initial-view-related metadata may further include scene-wise FOV information indicating the FOV corresponding to the scene.

The ROI-related metadata may include information related to the ROI. The ROI-related metadata may a 2d_roi_range_flag field and/or a 3d_roi_range_flag field. Each of the two fields may indicate whether the ROI-related metadata includes fields expressing the ROI based on the 2D image or whether the ROI-related metadata includes fields expressing the ROI based on the 3D space. In some embodiments, the ROI-related metadata may further include additional information, such as differential encoding information based on the ROI and differential transmission processing information based on the ROI.

In the case in which the ROI-related metadata includes fields expressing the ROI based on the 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. These fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. These fields may indicate the minimum x coordinate, the maximum x coordinate, the minimum y coordinate, and the maximum y coordinate of the coordinates in the ROI, respectively. These fields may be omitted.

In the case in which the ROI-related metadata includes fields expressing the ROI based on the coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the RO occupies in 3D space as the minimum/maximum values of yaw, pitch, and roll. These fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV-related metadata, a description of which will follow.

The FOV-related metadata may include the above information related to the FOV. The FOV-related metadata may include a content_fov_flag field and/or a content_fov field. In some embodiments, the FOV-related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360-degree video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region-related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case in which the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region-related metadata may include an is_cropped_region field, a cr_region_left_top_x field, a cr_region_left_top_y field, a cr_region_width field, and/or a cr_region_height field. In some embodiments, the cropped-region-related metadata may further include additional information.

The is_cropped_region field may be a flag indicating whether the entire area of the image frame is used by the 360-degree video reception apparatus or the VR display. That is, this field may indicate whether the entire image frame is the active video area. In the case in which only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

As described above, the 360-degree-video-related signaling information or metadata may be transmitted while being included in a randomly defined signaling table, or may be transmitted while being included in a file format of ISOBMFF or Common File Format in the form of a box, or may be transmitted while being included in DASH MPD. Also, the 360-degree media data may be transmitted while being included in the file format or DASH segment.

Figure 9:
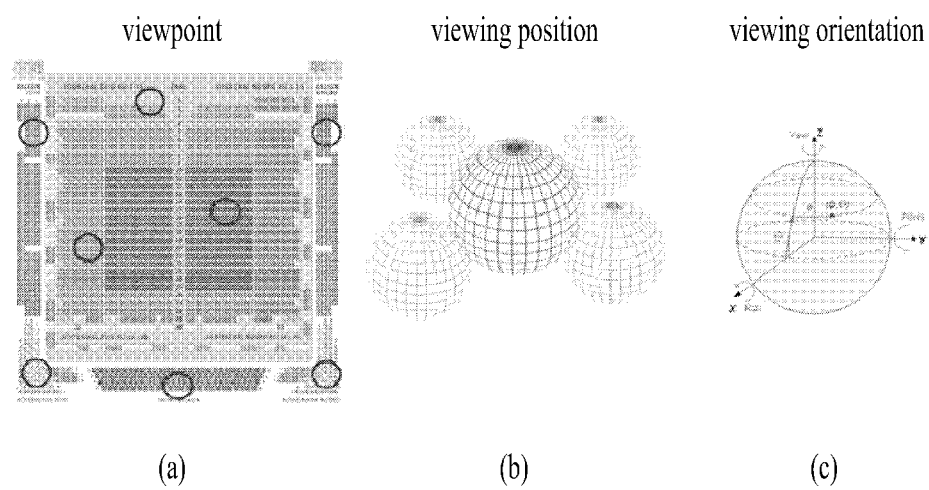
FIG. 9 is a view showing a viewpoint and viewing position additionally defined in a 3DoF+ VR system.

FIG. 9 is a view showing a viewpoint and viewing position additionally defined in a 3DoF+ VR system.

The 360-degree video based VR system of the present invention may provide visual/auditory experiences for different viewing orientations based on a position of a user for 360-degree video. This method may be referred to as 3DoF (three degree of freedom) plus. In detail, the VR system that provides visual/auditory experiences for different orientations in a fixed position of a user may be referred to as a 3DoF based VR system.

Meanwhile, the VR system that may provide extended visual/auditory experiences for different orientations in different viewpoints and different viewing positions at the same time zone may be referred to as a 3DoF+ or 3DoF plus based VR system.

Supposing a space such as (a) (example of art center), different positions (example of art center marked with a red circle) may be considered as the respective viewpoints. At this time, video/audio provided by the respective viewpoints existing in the same space as example may have the same time flow.

In this case, different visual/auditory experiences may be provided in accordance with a viewpoint change (head motion) of a user in a specific position. That is, spheres of various viewing positions may be assumed as shown in (b) for a specific viewpoint, and video/audio/text information in which a relative position of each viewpoint is reflected may be provided.

Meanwhile, visual/auditory information of various orientations such as the existing 3DoF may be delivered at a specific viewpoint of a specific position as shown in (c). In this case, additional various sources as well as main sources (video/audio/text) may be provided in combination, and this may be associated with a viewing orientation of a user or information may be delivered independently.

Figure 10:
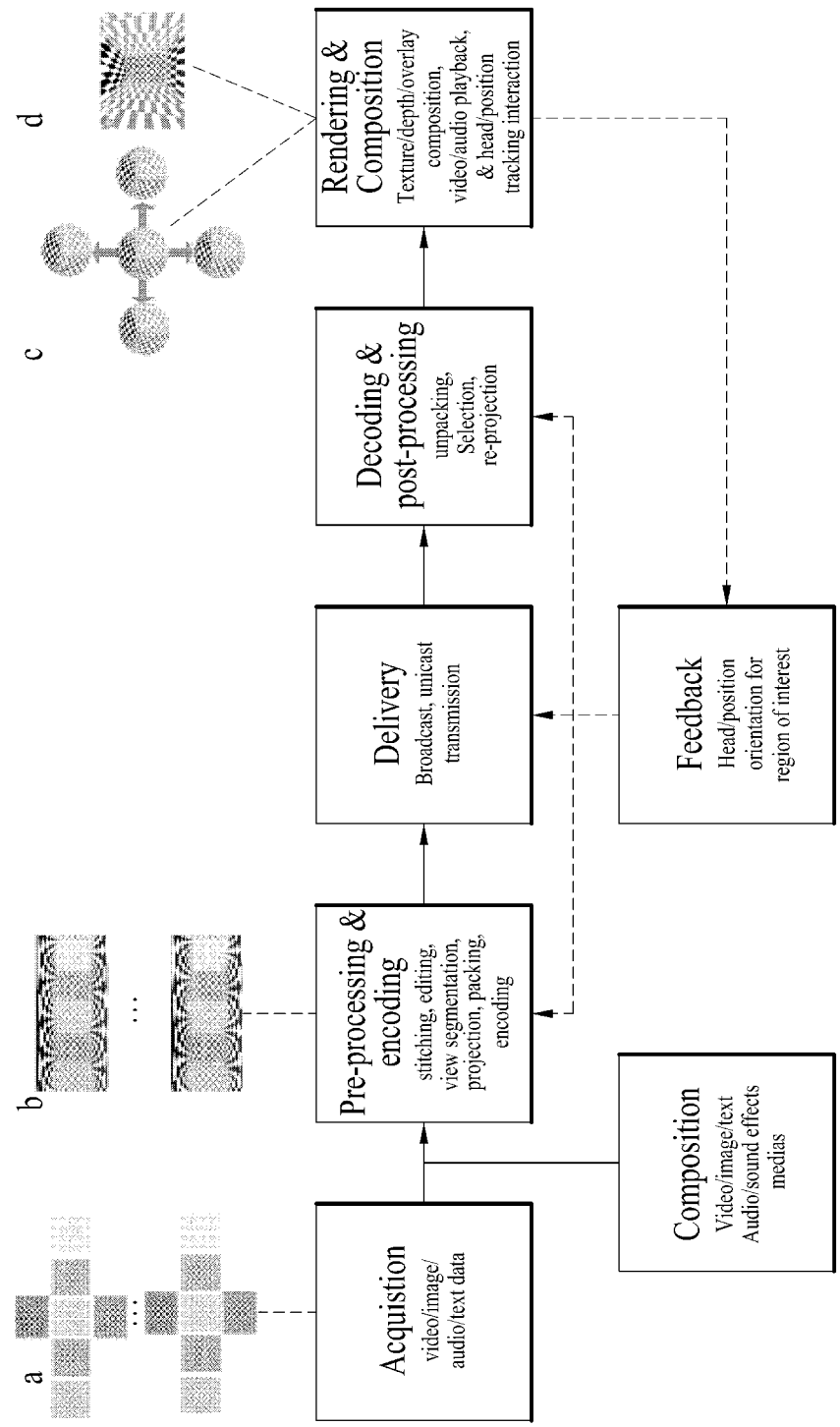
FIG. 10 is a view showing a method for implementing 360-degree video signal processing and related transmission apparatus/reception apparatus based on 3DoF+ system.

FIG. 10 is a view showing a method for implementing 360-degree video signal processing and related transmission apparatus/reception apparatus based on 3DoF+ system.

FIG. 10 is an example of 3DoF+ end-to-end system flow chart including video acquisition, pre-processing, transmission, (post)processing, rendering and feedback processes of 3DoF+.

Acquisition: may mean a process of acquiring 360-degree video through capture, composition or generation of 360-degree video. Various kinds of video/audio information according to head motion may be acquired for a plurality of positions through this process. In this case, video information may include depth information as well as visual information (texture). At this time, a plurality of kinds of information of different viewing positions according to different viewpoints may be acquired like example of video information of a.

Composition: may define a method for composition to include video (video/image, etc.) through external media, voice (audio/effect sound, etc.) and text (caption, etc.) as well as information acquired through the video/audio input module in user experiences.

Pre-processing: is a preparation (pre-processing) process for transmission/delivery of the acquired 360-degree video, and may include stitching, projection, region wise packing and/or encoding process. That is, this process may include pre-processing and encoding processes for modifying/complementing data such as video/audio/text information in accordance with a producer's intention. For example, the pre-processing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video in accordance with a region, and encoding for compressing video information. A plurality of projection videos of different viewing positions according to different viewpoints may be generated like example in view of video of B.

Delivery: may mean a process of processing and transmitting video/audio data and metadata subjected to the preparation process (pre-processing). As a method for delivering a plurality of video/audio data and related metadata of different viewing positions according to different viewpoints, a broadcast network or a communication network may be used, or unidirectional delivery method may be used.

Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

Rendering: may mean a process of rendering and displaying re-projected image/video data on a 3D space. In this process, the process may be reconfigured to finally output video/audio signals. A viewing orientation, viewing position/head position and viewpoint, in which a user's region of interest exists, may be subjected to tracking, and necessary video/audio/text information may selectively be used in accordance with this information. At this time, in case of video signal, different viewing positions may be selected in accordance with the user's region of interest as shown in c, and video in a specific orientation of a specific viewpoint at a specific position may finally be output as shown in d.

Feedback: may mean a process of delivering various kinds of feedback information, which can be acquired during a display process, to a transmission side. In this embodiment, a viewing orientation, a viewing position, and a viewpoint, which corresponds to a user's region of interest, may be estimated, and feedback may be delivered to reproduce video/audio based on the estimated result.

Figure 11:
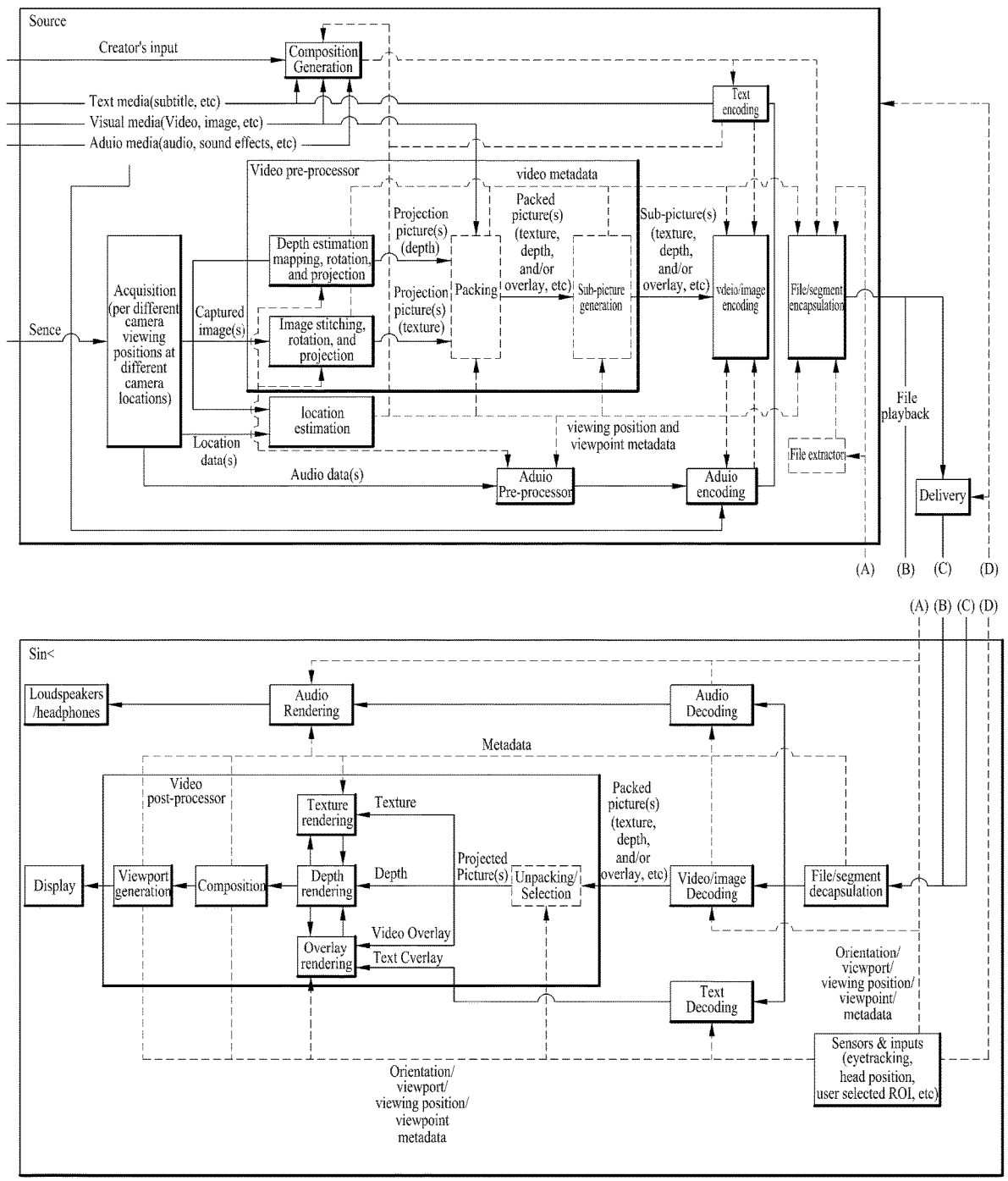
FIG. 11 is a view showing an architecture of a 3DoF+ end-to-end system.

FIG. 11 is a view showing an architecture of a 3DoF+ end-to-end system.

FIG. 11 is an example of a 3DoF+ end-to-end system architecture. As described in the architecture of FIG. 11, 3DoF+ 360 contents may be provided.

The 360-degree video transmission apparatus may include an acquisition unit for acquiring 360-degree video (image)/audio data, a video/audio pre-processor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception apparatus through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information in accordance with sensor orientation (viewing orientation in view of video), information acquisition timing of a sensor (sensor position, or viewing position in view of video), and information acquisition position of a sensor (viewpoint in case of video). At this time, video, image, audio and position information may be acquired.

In case of video data, texture and depth information may respectively be acquired, and video pre-processing may be performed in accordance with characteristic of each component. For example, in case of the text information, 360-degree omnidirectional video may be configured using videos of different orientations of the same viewing position, which are acquired at the same viewpoint using image sensor position information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video pre-processing end is delivered as video metadata.

If video/audio/text information additionally given in addition to the acquired data (or data for main service) are together served, it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis in accordance with application. At this time, only necessary information may be extracted (file extractor) in accordance with a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing position information according to each viewpoint (viewing position and viewpoint metadata), etc. This information may be processed through a separate metadata processor.

The 360-degree video reception apparatus may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text in accordance with types of data and separately decoded to be reproduced.

The tracking unit generates viewpoint of a user's region of interest, viewing position at the corresponding viewpoint, and viewing orientation information at the corresponding viewing position based on a sensor and the user's input information. This information may be used for selection or extraction of a region of interest in each module of the 360-degree video reception apparatus, or may be used for a post-processing process for emphasizing information of the region of interest. Also, if this information is delivered to the 360-degree video transmission apparatus, this information may be used for file selection (file extractor) or subpicture selection for efficient bandwidth use, and may be used for various video reconfiguration methods based on a region of interest (viewport/viewing position/viewpoint dependent processing).

The decoded video signal may be processed in accordance with various processing methods of the video configuration method. If image packing is performed in the 360-degree video transmission apparatus, a process of reconfiguring video is required based on the information delivered through metadata. In this case, video metadata generated by the 360-degree video transmission apparatus may be used. Also, if videos of a plurality of viewpoints or a plurality of viewing positions or various orientations are included in the decoded video, information matched with viewpoint, viewing position, and orientation information of the user's region of interest, which are generated through tracking, may be selected and processed. At this time, viewing position and viewpoint metadata generated at the transmission side may be used. Also, if a plurality of components are delivered for a specific position, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated in accordance with the user's region of interest.

The decoded audio signal may be generated as an audio signal capable of being reproduced, through an audio renderer and/or the post-processing process. At this time, information suitable for the user's request may be generated based on the information on the user's region of interest and the metadata delivered to the 360-degree video reception apparatus.

The decoded text signal may be delivered to an overlay renderer and processed as overlay information based on text such as subtitle. A separate text post-processing process may be included if necessary.

Figure 12:
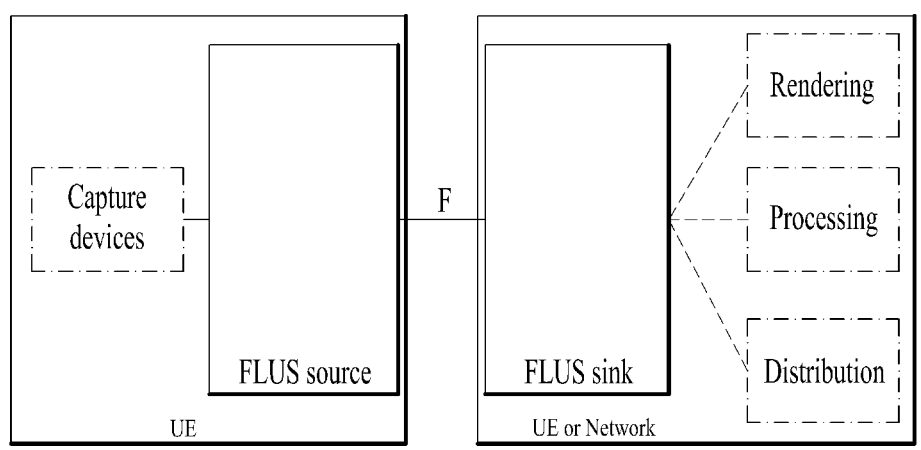
FIG. 12 is a view showing an architecture of a Frame for Live Uplink Streaming (FLUS)

FIG. 12 is a view showing an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission apparatus or the aforementioned 360-degree reception apparatus.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

Figure 13:
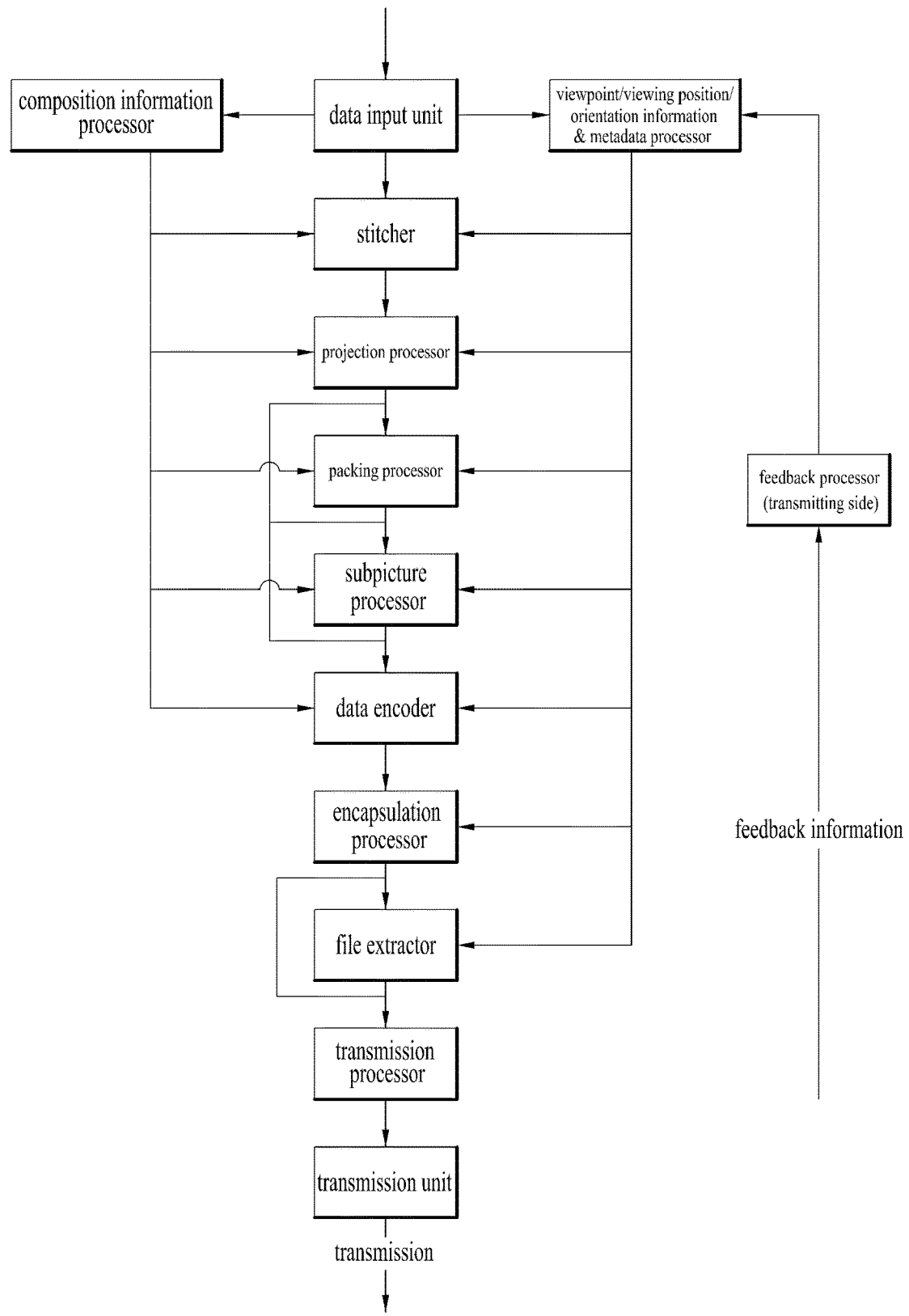
FIG. 13 is a view showing a configuration of 3DoF+ transmission side.

FIG. 13 is a view showing a configuration of 3DoF+ transmission side.

The transmission side (360-degree video transmission apparatus) may perform stitching for sphere image configuration per viewpoint/viewing position/component if input data are images output through a camera. If sphere images per viewpoint/viewing position/component are configured, the transmission side may perform projection for coding in 2D image. The transmission side may generate a plurality of images as subpictures of a packing or segmented region for making an integrated image in accordance with application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed in accordance with application or request of the system. The generated bitstreams may be converted to the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

Figure 14:
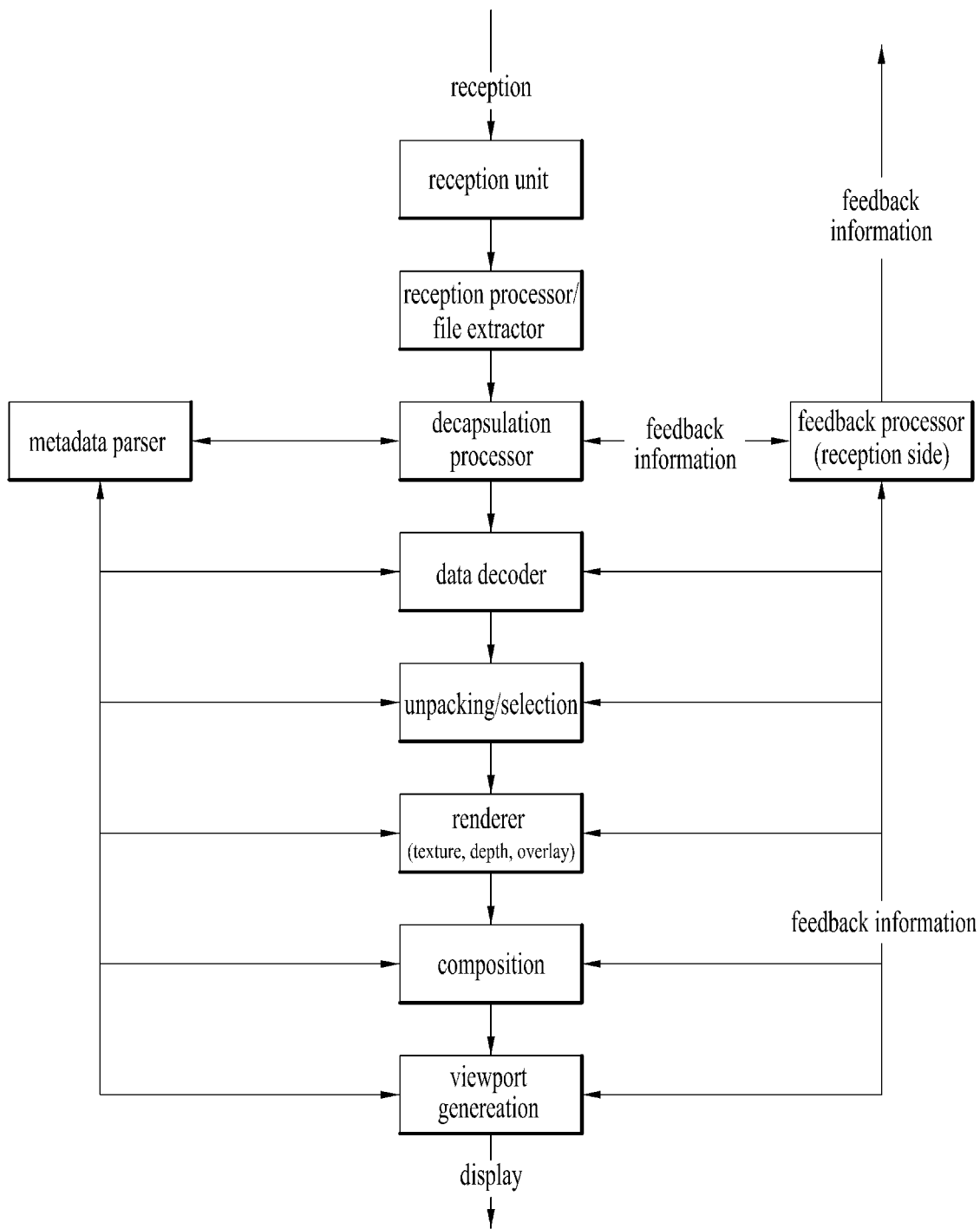
FIG. 14 is a view showing a configuration of 3DoF+ reception side.

FIG. 14 is a view showing a configuration of 3DoF+ reception side.

The reception side (360-degree video reception apparatus) may extract a necessary file after receiving the bitstreams delivered from the transmission side. The reception side may select bitstreams in the generated file format by using the viewpoint/viewing position/orientation information delivered from the feedback processor and reconfigure the selected bitstreams as image information through the decoder. The reception side may perform unpacking for the packed image based on packing information delivered through the metadata. If the packing process is omitted in the transmission side, unpacking of the reception side may also be omitted. Also, the reception side may perform a process of selecting images suitable for the viewpoint/viewing position/orientation information delivered from the feedback processor and necessary components if necessary. The reception side may perform a rendering process of reconfiguring texture, depth and overlay information of images as a format suitable for reproduction. The reception side may perform a composition process for composing information of different layers before generating a final image, and may generate and reproduce an image suitable for a display viewport.

Figure 15:
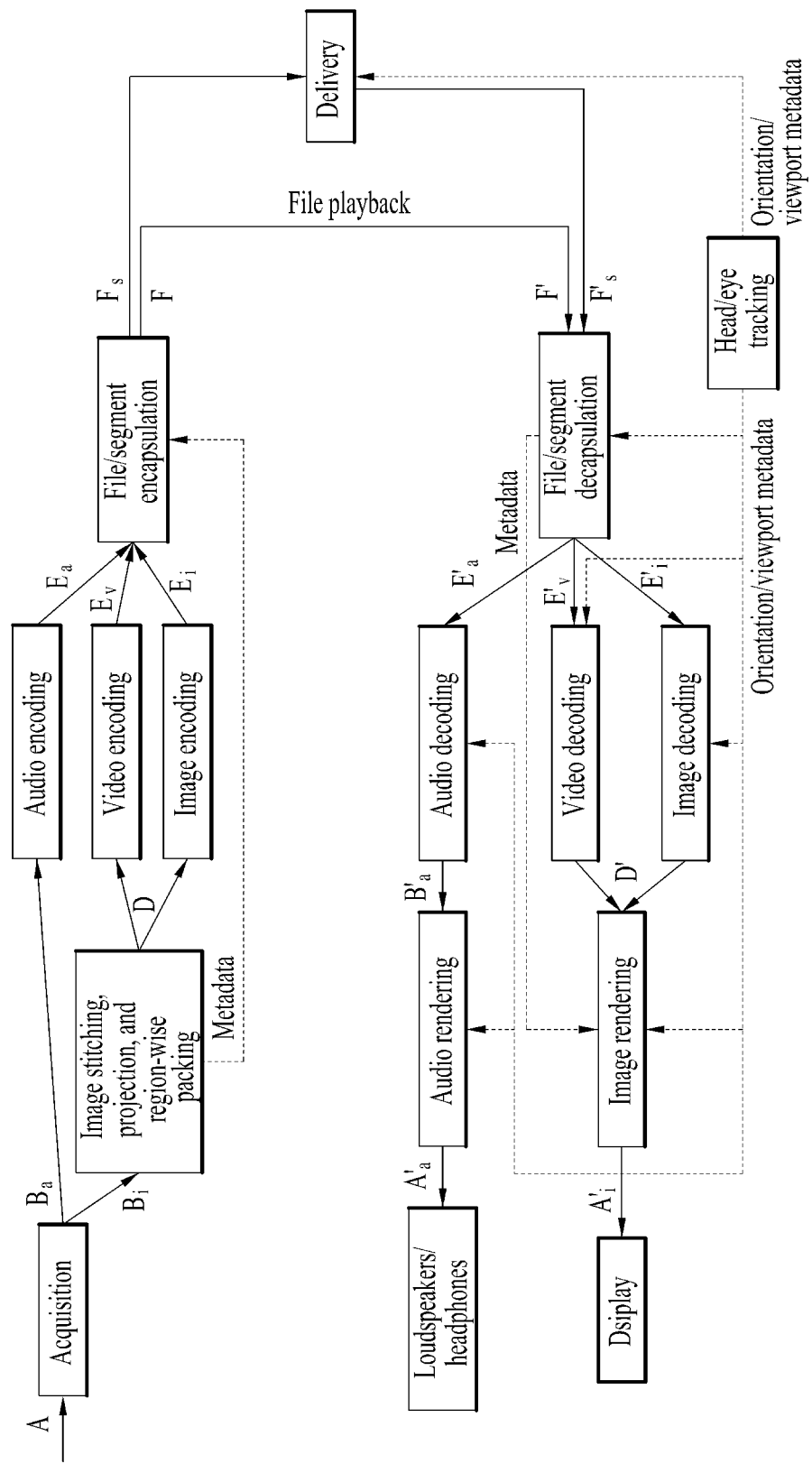
FIG. 15 is a view showing an OMAF structure.

FIG. 15 is a view showing an OMAF structure.

The 360-degree video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in a random viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

Figure 16:
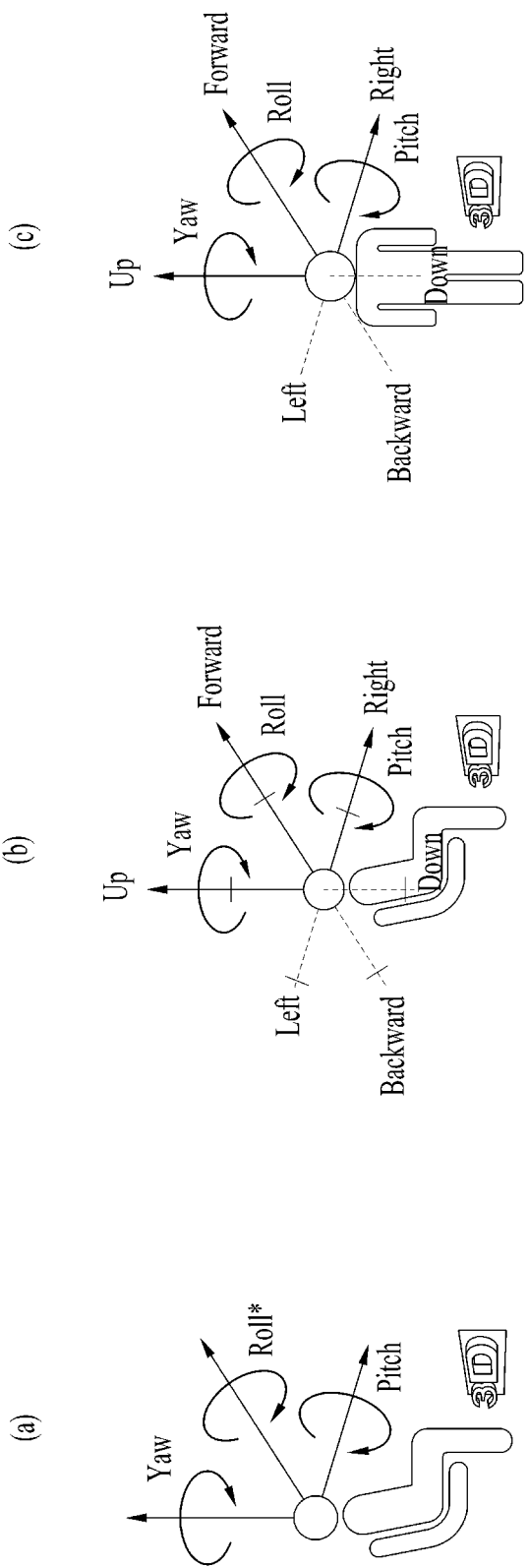
FIG. 16 is a view showing a type of media according to movement of a user.

FIG. 16 is a view showing a type of media according to movement of a user.

The present invention proposes a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which can provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present invention proposes a method for effectively providing 6DoF video. The 6DoF video may be captured at different positions by two or more cameras. The captured video may be transmitted through a series of processes, and the reception side may process and render some of the received data as 360-degree video having an initial position of the user as a starting point. If the position of the user moves, the reception side may process and render new 360-degree video based on the position where the user has moved, whereby the 6DoF video may be provided to the user.

Hereinafter, a transmission method and a reception method for providing 6DoF video services will be described.

Figure 17:
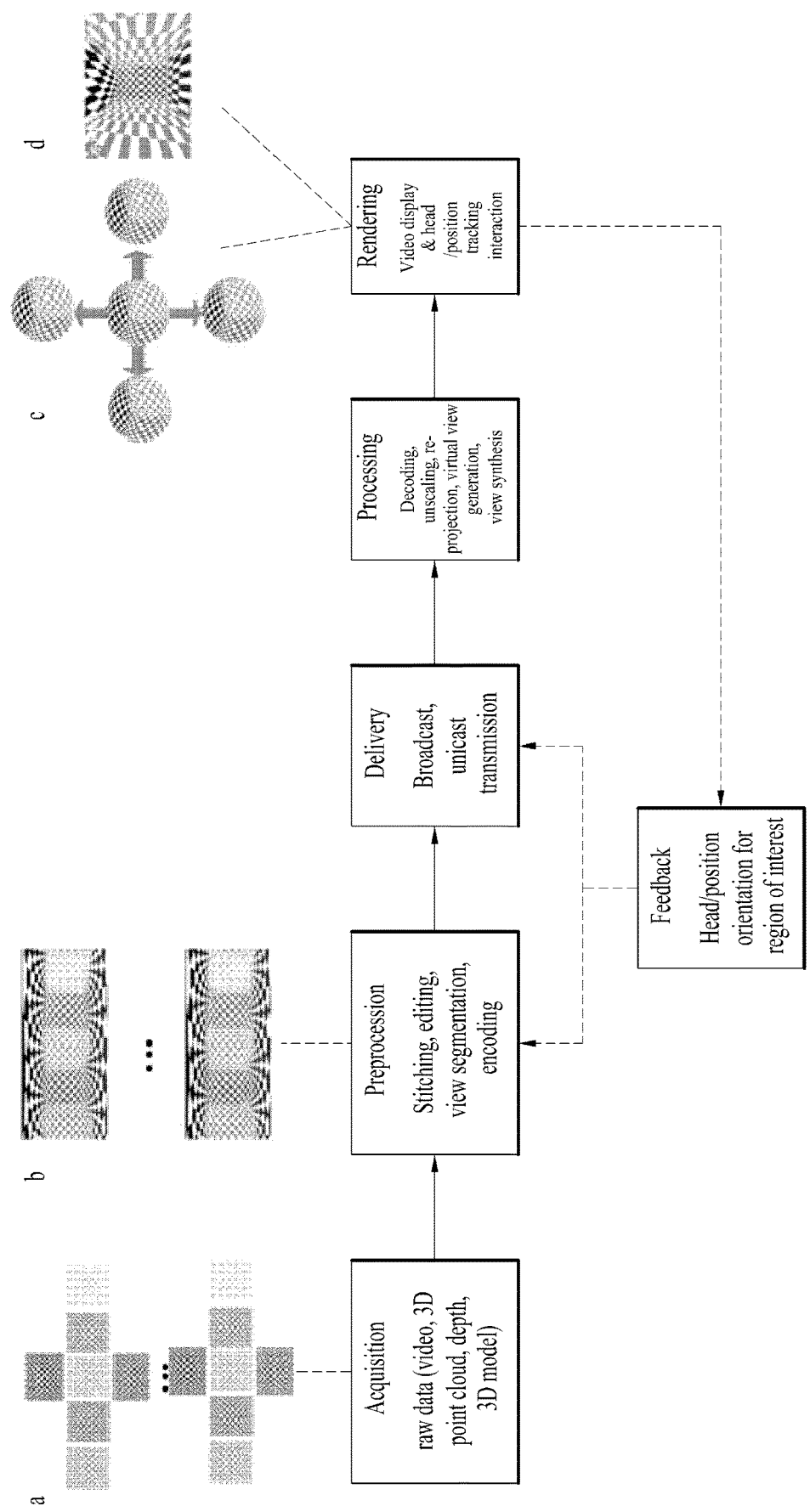
FIG. 17 is a view showing the entire architecture for providing 6DoF video.

FIG. 17 is a view showing the entire architecture for providing 6DoF video.

A series of the processes described above will be described in detail based on FIG. 17. First of all, as an acquisition step, HDCA (High Density Camera Array), Lenslet (microlens) camera, etc. may be used to capture 6DoF contents, and 6DoF video may be acquired by a new device designed for capture of the 6DoF video. The acquired video may be generated as several image/video data sets generated in accordance with a position of a camera, which is captured as shown in FIG. 3a. At this time, metadata such as internal/external setup values of the camera may be generated during the capturing process. In case of image generated by a computer not the camera, the capturing process may be replaced. The pre-processing process of the acquired video may be a process of processing the captured image/video and the metadata delivered through the capturing process. This process may correspond to all of types of pre-processing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in FIG. 3b, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may newly be generated by the receiver as virtual information as the case may be.

In some embodiments, the pre-processing process may further include an editing process. In this process, editing for image/video data may further be performed before and after projection, and metadata may be generated even during the pre-processing process. Also, when the image/video are provided, metadata for an initial view to be first reproduced and an initial position and a region of interest (ROI) of a user may be generated.

The media transmission step may be a process of processing and transmitting the image/video data and metadata acquired during the pre-processing process. Processing according to a random transmission protocol may be performed for transmission, and the pre-processed data may be delivered through a broadcast network and/or a broadband. The pre-processed data may be delivered to the reception side in an on demand manner.

The processing process may include all steps before image is generated, wherein all steps may include decoding the received image/video data and metadata, re-projection which may be called mapping or projection into a 3D model, and a virtual view generation and composition process. The 3D model which is mapped or a projection map may include a sphere, a cube, a cylinder or a pyramid like the existing 360-degree video, and may be a modified type of a projection map of the existing 360-degree video, or may be a projection map of a free type as the case may be.

The virtual view generation and composition process may mean a process of generating and composing the image/video data to be reproduced when the user moves between the primary view and the secondary view or between the primary view and the primary view. The process of processing the metadata delivered during the capture and pre-processing processes may be required to generate the virtual view. As the case may be, some of the 360-degree images/videos not all of the 360-degree images/videos may be generated/composed.

In some embodiments, the processing process may further include an editing process, an up scaling process, and a down scaling process. Additional editing required before reproduction may be applied to the editing process after the processing process. The process of up scaling or down scaling the received images/videos may be performed if necessary.

The rendering process may mean a process of rendering image/video, which is re-projected by being transmitted or generated, to be displayed. As the case may be, rendering and re-projection process may be referred to as rendering. Therefore, the rendering process may include the re-projection process. A plurality of re-projection results may exist in the form of 360-degree video/image based on the user and 360-degree video/image formed based on the position where the user moves in accordance with a moving direction as shown in FIG. 3c. The user may view some region of the 360-degree video/image in accordance with a device to be displayed. At this time, the region viewed by the user may be a form as shown in FIG. 3d. When the user moves, the entire 360-degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which can be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
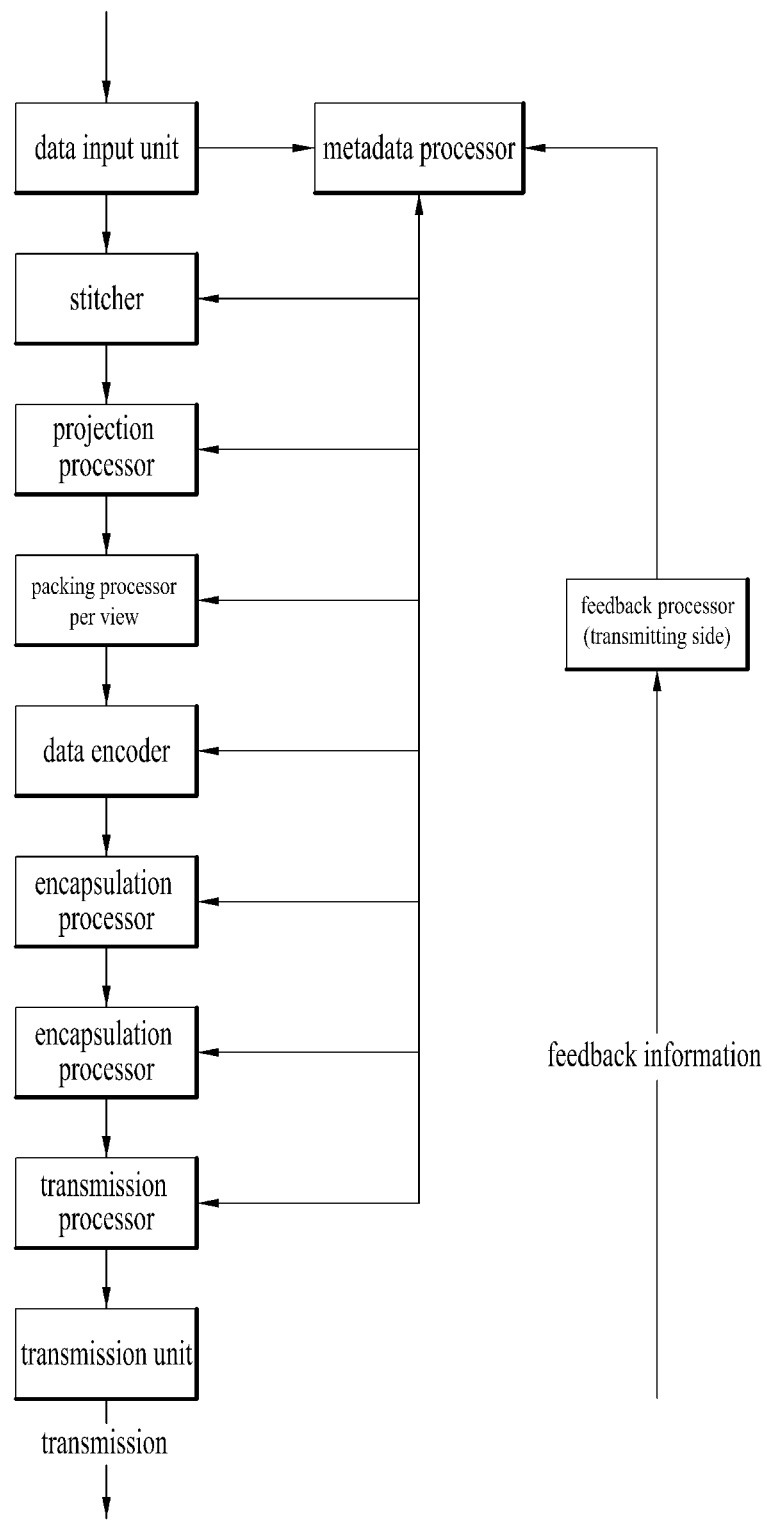
FIG. 18 is a view showing a configuration of a transmission apparatus for providing 6DoF video services.

FIG. 18 is a view showing a configuration of a transmission apparatus for providing 6DoF video services.

The present invention at the transmission side may be related to the 6DoF video transmission apparatus. The 6DoF video transmission apparatus may perform the aforementioned preparation processes and operations. The 6DoF video/image transmission apparatus according to the present invention may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmission unit as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360-degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results in accordance with a scheme, and the corresponding scheme may similar to the projection scheme of the existing 360-degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception side.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission-processor may perform additional processing for transmission on the encapsulated video data in accordance with the format. The corresponding processing may be performed using the metadata received from the metadata processor. The transmission unit may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception apparatus, which will be described later, and may deliver the feedback information to the feedback processor (transmission side). The feedback processor may deliver the information received from the reception side to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment of the present invention, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission apparatus may be hardware components implemented by hardware. In some embodiments, the respective components may be modified or omitted or new components may be added thereto, or may be replaced with or incorporated into the other components.

Figure 19:
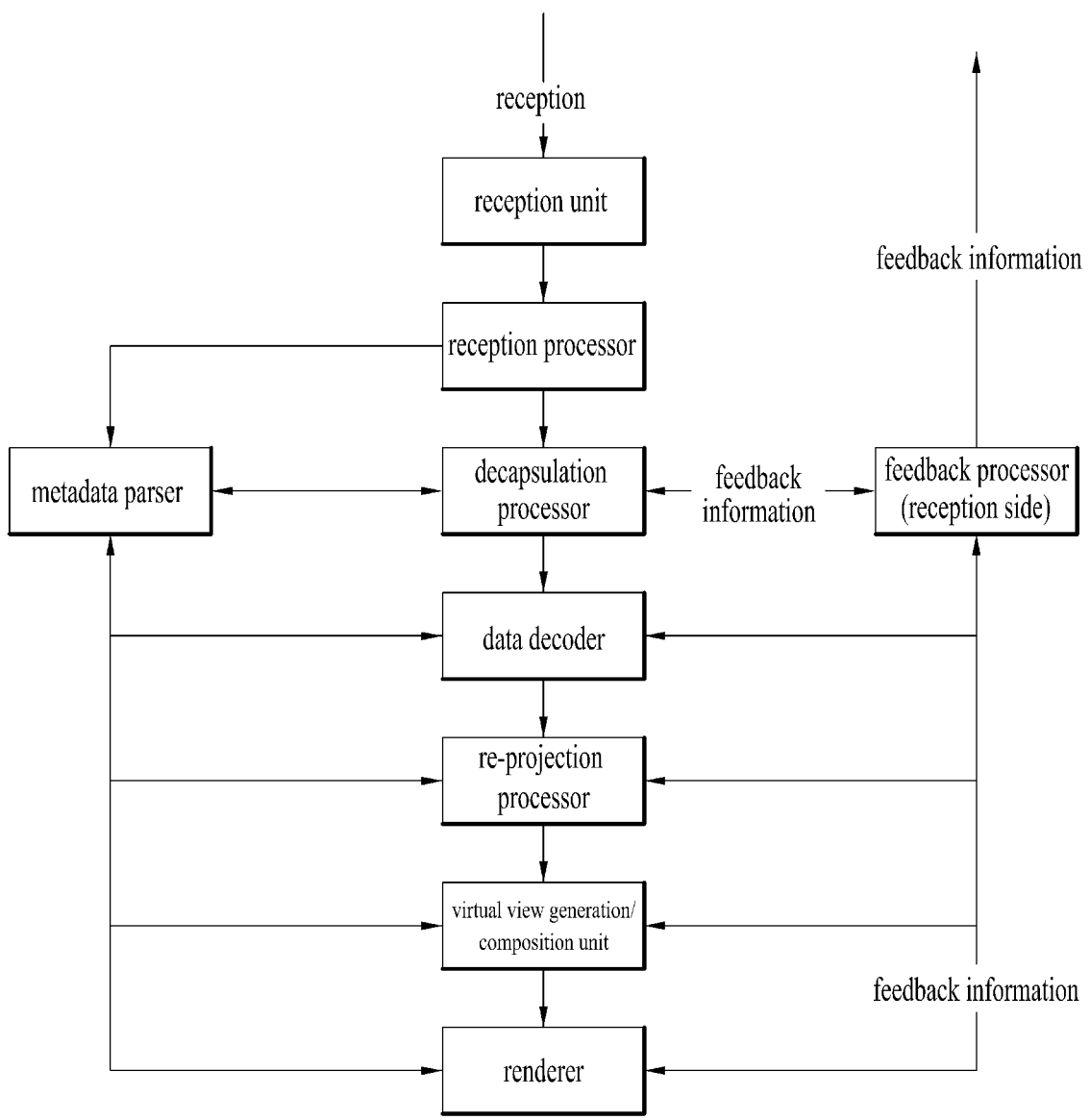
FIG. 19 is a view showing a configuration of 6DoF video reception apparatus.

FIG. 19 is a view showing a configuration of 6DoF video reception apparatus.

The present invention may be related to the reception apparatus. According to the present invention, the 6DoF video reception apparatus may include a reception unit, a reception processor, a decapsulation-processor, a metadata parser, a feedback processor, a data decoder, a re-projection processor, a virtual view generation/composition unit and/or a renderer as components.

The reception unit may receive video data from the aforementioned 6DoF transmission apparatus. The reception unit may receive the video data through a broadcast network or a broadband in accordance with a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. As needed, the decapsulation-processor may receive metadata necessary for decapsulation from the metadata parser.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generation/composition unit and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/composition unit may generate video data, which are not included in the 6DoF video data re-projected by being transmitted and received on the 3D space but need to be reproduced, in a virtual view area by using given data, and may compose video data in a new view/position based on the virtual view. The virtual view generation/composition unit may use data of the depth information processor (not shown) when generating video data of a new view. The virtual view generation/composition unit may generate/compose the specific area received from the metadata parser and a portion of a peripheral virtual view area, which is not received. The virtual view generation/composition unit may selectively be performed, and is performed when there is no video information corresponding to a necessary view and position.

The renderer may render the 6DoF video data delivered from the re-projection unit and the virtual view generation/composition unit. As described above, all the processes occurring in the re-projection unit or the virtual view generation/composition unit on the 3D space may be incorporated within the renderer such that the renderer can perform these processes. In some embodiments, the renderer may render only a portion that is being viewed by a user and a portion on a predicted path in accordance with the user's view/position information.

In the present invention, the feedback processor (reception side) and/or the network interface (not shown) may be included as additional components. The feedback processor of the reception side may acquire and process feedback information from the renderer, the virtual view generation/composition unit, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmission unit. The feedback information may be consumed in each component of the reception side. For example, the decapsulation processor may receive position/viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/composition, and rendering.

The components of the aforementioned 6DoF video reception apparatus may be hardware components implemented by hardware. In some embodiments, the respective components may be modified or omitted or new components may be added thereto, or may be replaced with or incorporated into the other components.

Figure 20:
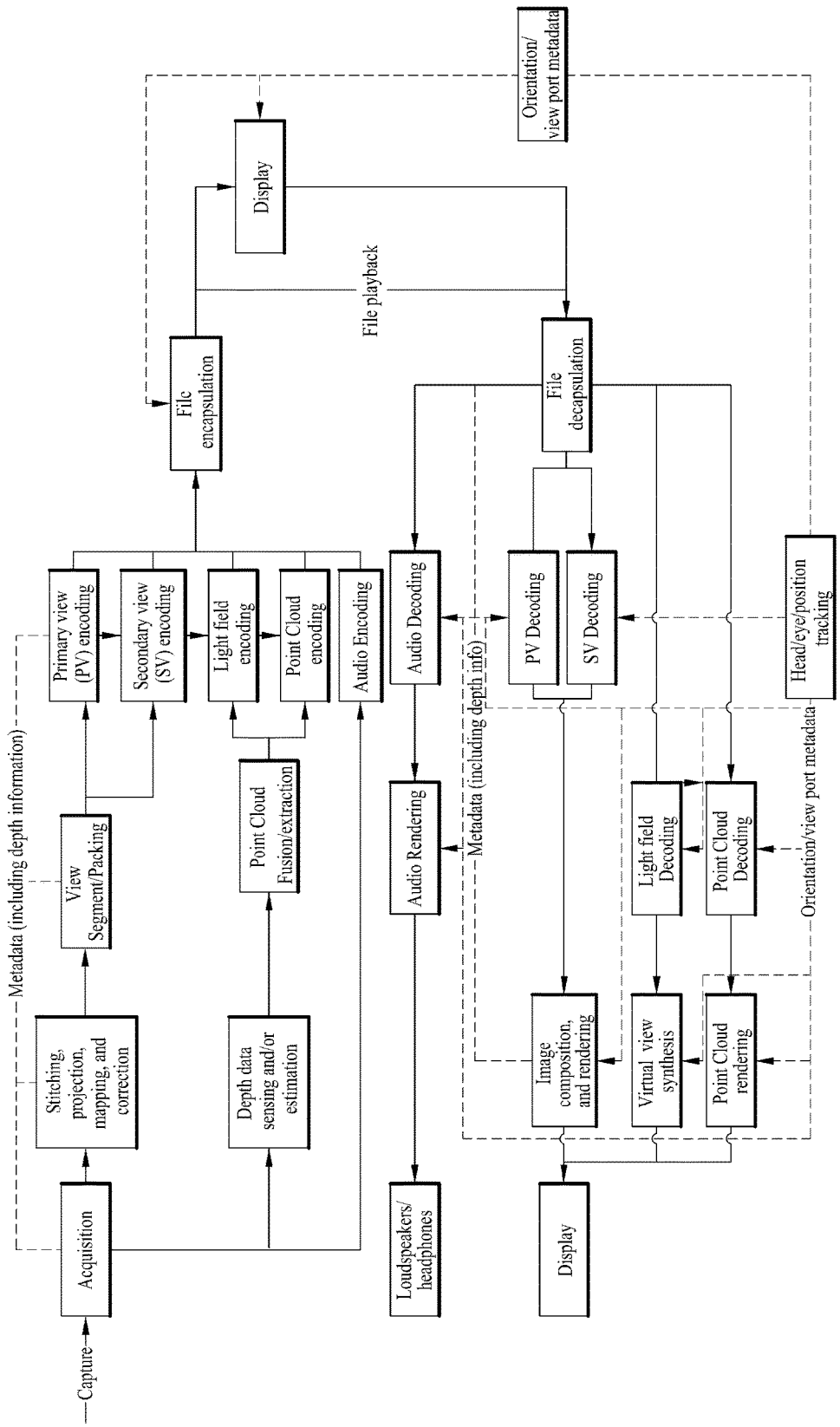
FIG. 20 is a view showing a configuration of 6DoF video transmission/reception apparatus.

FIG. 20 is a view showing a configuration of 6DoF video transmission/reception apparatus.

6DoF contents may be provided in the form of file or segment based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio Encoding: 6DoF audio data may be subjected to audio pre-processing and encoding. In this process, metadata may be generated, and related metadata may be subjected to encapsulation/encoding for transmission.

Stitching, Projection, mapping, and correction: 6DoF video data may be subjected to editing, stitching and projection of the image acquired at various positions as described above. Some of these processes may be performed in accordance with the embodiment, or all of the processes may be omitted and then may be performed by the reception side.

View segmentation/packing: As described above, the view segmentation/packing processor may segment images of a primary view (PV), which are required by the reception side, based on the stitched image and pack the segmented images and then perform pre-processing for packing the other images as secondary views. Size, resolution, etc. of the primary view and the secondary views may be controlled during the packing process to enhance coding efficiency.

Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point Cloud Fusion/extraction: a process of modifying a previously acquired depth map to data capable of being encoded may be performed. For example, a pre-processing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed to segments.

Metadata (including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception side. The reception side may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception apparatus may perform processing for 6DoF video/audio data reception.

Audio decoding/Audio rendering/Loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point Cloud rendering: when captured video/image data are re-projected on a 3D space, a 3D spatial position is configured, and a process of generating a 3D space of a virtual view to which a user can move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or composition process may be omitted.

Image composition, and rendering: as a process of rendering image based on a user's position, video data decoded in accordance with the user's position and eyes may be used or video and image near the user, which are made by the virtual view generation/composition, may be rendered.

Figure 21:
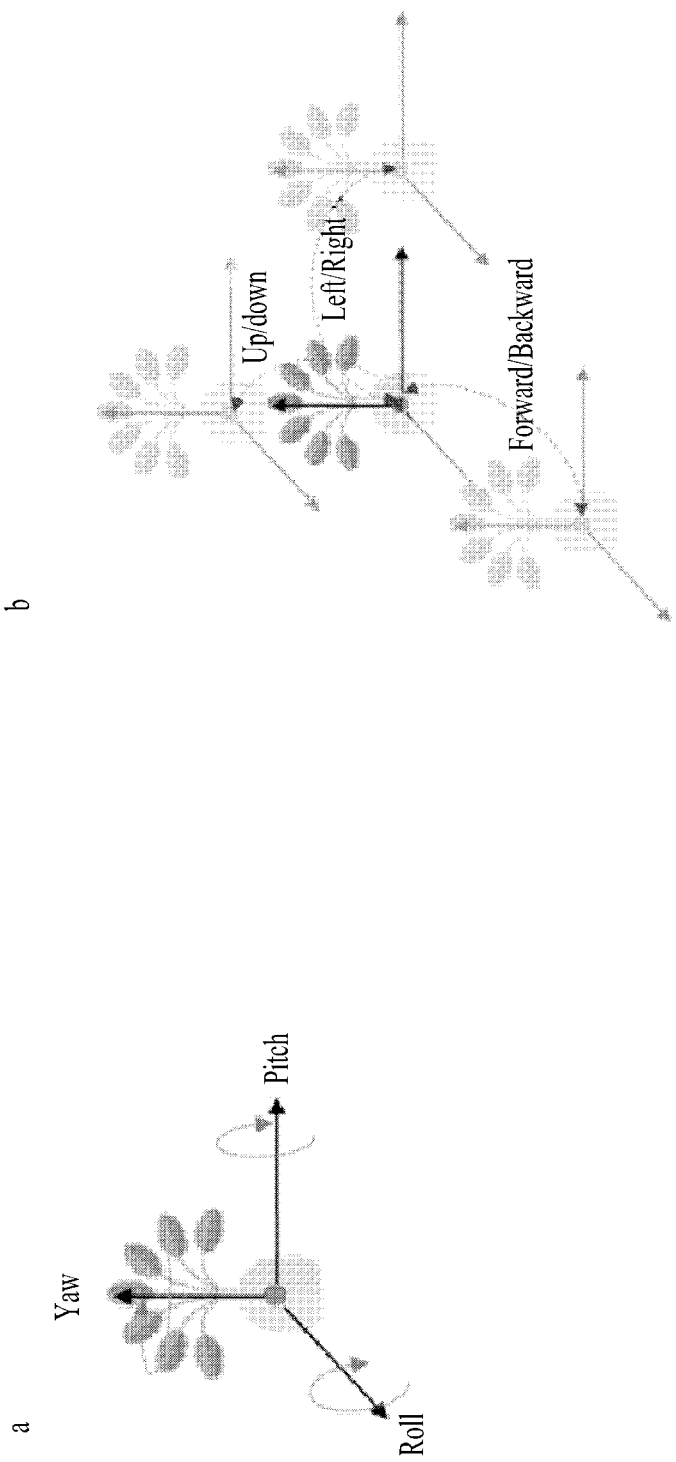
FIG. 21 is a view showing 6DoF space.

FIG. 21 is a view showing 6DoF space.

In the present invention, a 6DoF space before projection or after re-projection will be described and the concept of FIG. 21 may be used to perform corresponding signaling.

The 6DoF space may categorize an orientation of movement into two types, rational and translation, unlike the case that the 360-degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present invention proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): region may mean a region where 360-degree video data projected on 2D image are located in a packed frame through region-wise packing. In this case, the region may mean a region used in region-wise packing in accordance with the context. As described above, regions may be identified by equally dividing 2D image, or may be identified by being randomly divided in accordance with a projection scheme.

Region (general meaning): unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: picture may mean the entire 2D image in which 360-degree video data are projected. In some embodiments, a projected frame or a packed frame may be the picture.

Sub-picture: sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: tile is a lower concept of a sub-picture, and the sub-picture may be used as a tile for tiling. That is, the sub-picture and the tile in tiling may be the same concept. In detail, the tile may be a tool enabling parallel decoding or a tool for independent decoding in VR. In VR, tile may mean MCTS (Motion Constrained Tile Set) that restricts a range of temporal inter prediction to a current tile internal range. Therefore, the tile herein may be called MCTS.

Spherical region: spherical region or sphere region may mean one region on a spherical surface when 360-degree video data are rendered on a 3D space (for example, spherical surface) at the reception side. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. In accordance with the context, the spherical region may simply be called region.

Face: face may be a terminology for each face in accordance with a projection scheme. For example, if cube map projection is used, a front face, a rear face, side face, an upper face, or a lower face may be called face.

Virtual Reality (VR) corresponds to next generation media for providing users with a high immersive level and reality. VR 360-degree video is acquired from a camera, which can take omnidirectional videos, and the captured videos are produced as one panorama image through a stitching process.

Hereinafter, an architecture of a VR device and an operation of a control method for the VR device according to some embodiments of the present invention in which ROI based thumbnail for 360-degree video is extracted will be described in detail. The 360-degree video described hereinafter may mean image corresponding to the aforementioned 360-degree video data or 360-degree video data. Also, the 360-degree video described hereinafter may be called 360-degree video stream, VR 360-degree video, VR 360-degree video stream, etc.

Figure 22:
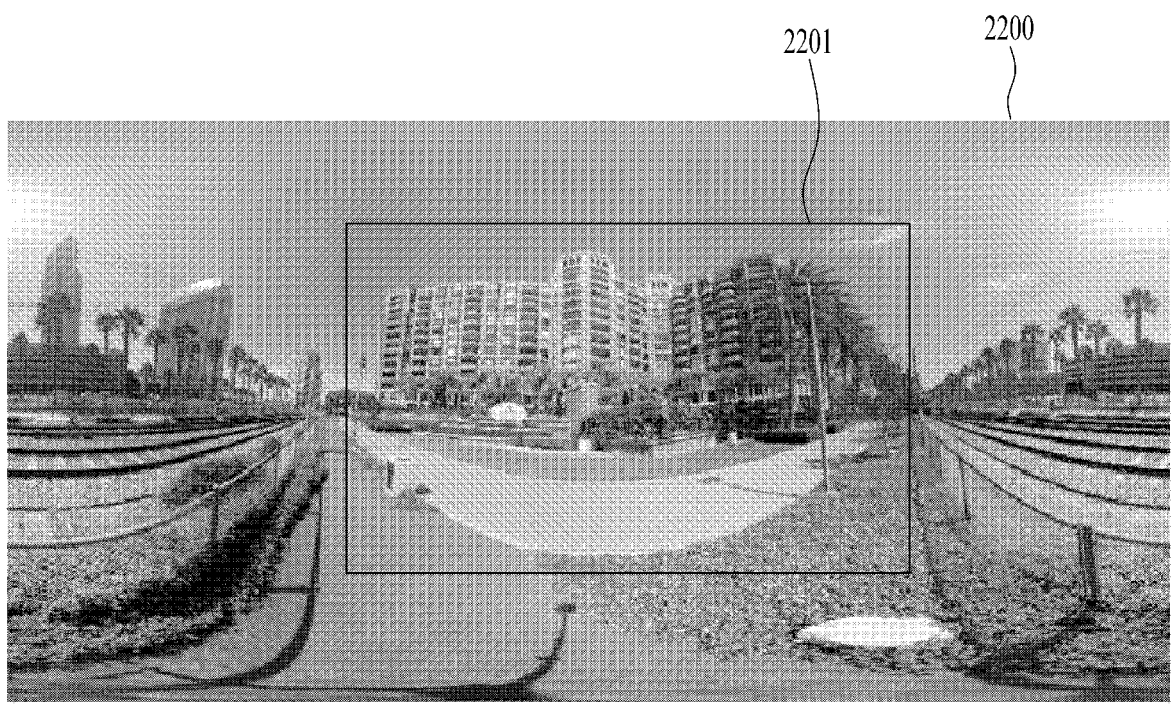
FIG. 22 is a view showing VR 360-degree video which is stitching-processed according to some embodiments of the present invention.

FIG. 22 is a view showing VR 360-degree video which is stitching-processed according to some embodiments of the present invention.

FIG. 22 shows an example of a video stitching-processed after being taken by VR 360-degree camera. A viewer may view a partial area (red box) for a specific view among full VR 360-degree videos, and may view the videos while freely moving a desired view through interaction with contents.

In other words, a stitched video 2200 of FIG. 22 indicates image/video subjected to the stitching process according to some embodiments of the present invention, or image data or video data subjected to projection according to some embodiments of the present invention.

A viewing area 2201 may mean an area where a viewer views videos using a VR device according to some embodiments of the present invention. In one embodiment, an inner area of the red box shown in FIG. 22 may be the viewing area. The viewer may view the stitched or projected image/video data 2200 while freely moving the viewing area 2201.

The VR 360-degree video has an advantage in providing a high realistic but picture quality and resolution of a video actually seen to a viewer may be low. When the viewer views VR video, a dizzy symptom due to low resolution and a low frame rate becomes a main factor that delays VR industry activity. Since 8K video has resolution of 16 times (four times of 4K video) of FHD video, 8K video transmission technology, video compression technology, real-time decoding and rendering technology, etc. are required to provide an active 8K video service. However, since a bandwidth is restrictive, there is limitation in streaming services of 8K video.

Therefore, the present specification proposes a VR device and a method for controlling the same according to some embodiments of the present invention, in which VR contents encoded with resolution of 8K, 60 fps or more are processed to overcome the above limitation and provide optimized VR experience. In detail, in the present specification, as a method for overcoming a bandwidth limitation, ISO/IEC 23090-2 Omnidirectional Media Application Format (MPEG-1 Part 2 OMAF) including Tile based encoding method will be described.

Figure 23:
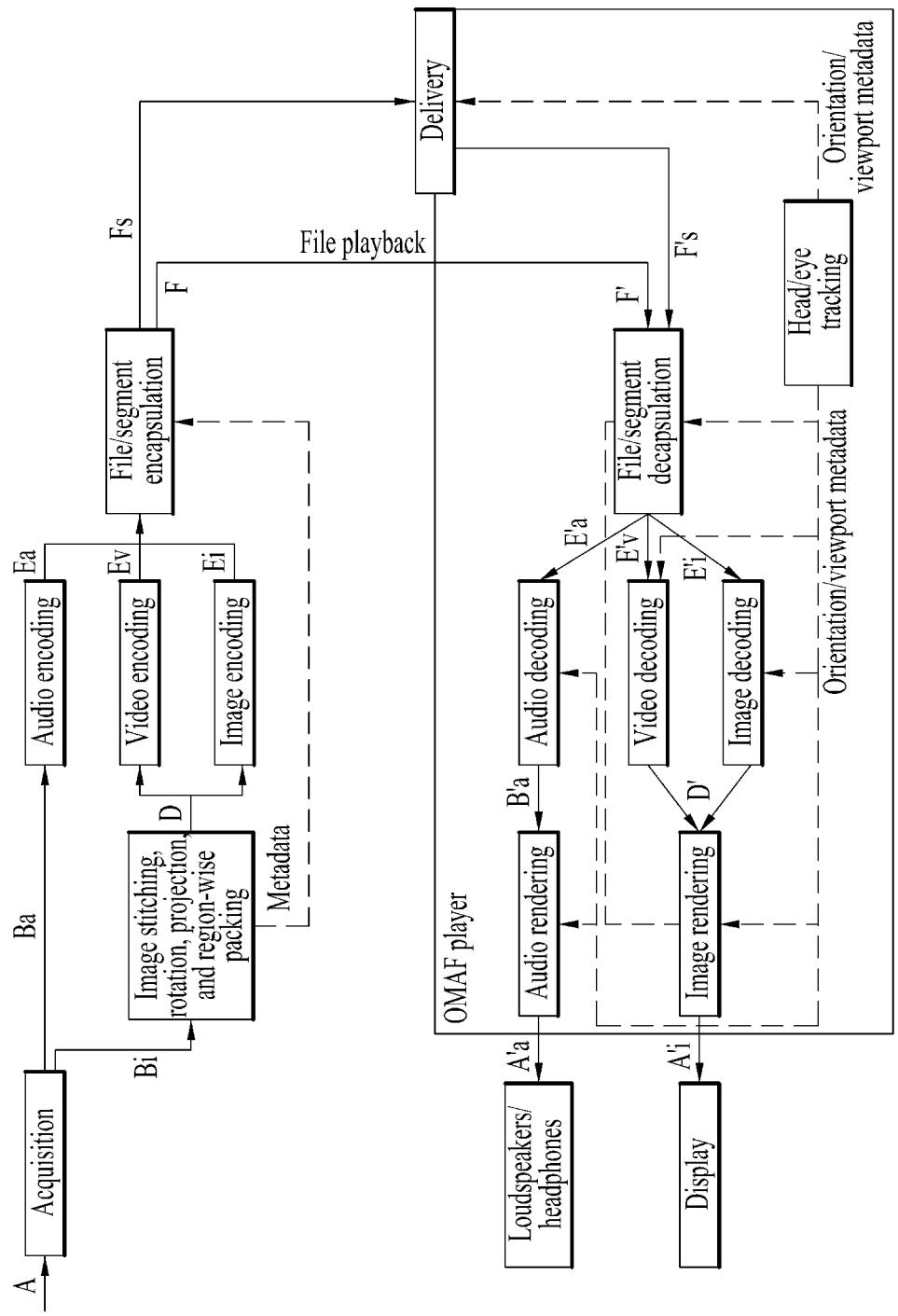
FIG. 23 shows an example of a VR device system according to some embodiments of the present invention.

FIG. 23 shows an example of a VR device system according to some embodiments of the present invention.

At least one or more switching processes of stitching, rotation, and projection are performed for a video taken using a camera that can take 360-degree video, whereby one 360-degree panorama video is generated. In order to increase coding efficiency for the 360-degree video panorama video, downsampling is applied to an area of the 360-degree panorama video, which is relatively less important than any other areas, and then region-wise packing is performed therefor. Information for this pre-processing is coded as metadata and then transmitted, wherein the metadata may include information related to stitching, rotation, projection and packing. The packed video and metadata are encoded and then transmitted to an OMAF player through a network.

The OMAF player of FIG. 23 1) restores metadata and packing video by decoding transmitted bitstreams, and 2) renders VR 360-degree video to be suitable for a display device of a user by using the restored metadata and packing video.

In the OMAF system, a region-wise packing (RWP) process is a process for improving coding efficiency by setting a rate of video information differently depending on importance in the VR 360-degree video. This region-wise packing (RWP) method is categorized into various methods in accordance with types of VR 360 camera and packing method.

In other words, the VR device and the method for controlling the same according to some embodiments of the present invention may be operated and controlled based on an Omnidirectional Media Application Format (OMAF) system. The OMAF system according to some embodiments of the present invention may be performed as described in FIG. 4.

First of all, 360 contents may be provided. The 360 contents may be provided in the form of file, or may be provided in the form of Dynamic Adaptive Streaming over HTTP (DASH) segment based download or streaming service based on DASH protocol, In this case, the 360 contents may be called 360-degree video, 360-degree video bistreams, VR 360-degree video, VR 360-degree video, VR 360-degree video bitstreams, etc.

Acquisition means a process of acquiring 360-degree video data and/or 360-degree audio data as described above. In one embodiment, the 360-video data and/or the 360-degree audio data may mean Real-world scene (A).

Image stitching, rotation, projection and region-wise packing according to the aforementioned embodiments of the present invention may be performed for the acquired 360-degree video/image data. At this time, metadata related to each operation of stitching, rotation, projection and region-wise packing may be generated. In this case, the acquired 360-degree video/image data may mean multiple-sensors-captured video or audio, B, Ba, Bi.

Audio encoding may be performed for the acquired 360-degree audio data. Audio encoding may include the aforementioned audio pre-processing.

Video encoding may be performed for the 360-degree video data subjected to image stitching, rotation, projection and region-wise packing as described above.

Image encoding may be performed for the 360-degree video data subjected to image stitching, rotation, projection and region-wise packing as described above.

In one embodiment, the 360-degree image/video data for which image stitching, rotation, projection and region-wise packing are performed may mean Projected/packed video D/D'. Also, the data for which video encoding, audio encoding and image encoding are performed may be coded video or audio bitstream E/E'.

File/segment encapsulation may be processed for the encoded 360-degree video data, the 360-degree audio data or the 360-degree image data by a file format such as ISOBMFF. Also, the encapsulation processor may process the encoded 360-degree video data and the encoded 360-degree image data in segments. The segments may be included in an individual track for transmission based on the aforementioned DASH. At this time, file/segment encapsulation may be performed based on the metadata related to each operation of stitching, rotation, projection and region-wise packing.

The 360-degree audio/video data (360-degree video bitstreams) may be subjected to processing for transmission in accordance with a transmission protocol and then transmitted in the form of ISOBMFF file/segment F/F'. Also, the 360-degree audio/video data may be transmitted in the form of a file playback. At this time, all or some (or signaling information) of the file/segment encapsulated 360-degree video streams may be transmitted through a separate delivery entity. The aforementioned 360-degree video reception apparatus may receive the 360-degree video through a broadcast network or a broadband.

The OMAF player may correspond to one embodiment of the 360-degree video reception apparatus. The OMAF player may mean a VR service platform according to the aforementioned embodiments of the present invention. The VR device according to some embodiments of the present invention may be the OMAF player.

File/segment decapsulation may be processed for reception of the 360-degree audio/image/video data. At this time, the 360-audio data, the 360-degree image data or the 360-degree video data may be bitstream types, and may be called 360-degree video bitstreams.

Audio decoding may be performed for the 360-degree audio data in accordance with the aforementioned description. Image decoding may be performed for the 360-degree image data in accordance with the aforementioned description. Video decoding may be performed for the 360-degree video data in accordance with the aforementioned description.

Image rendering provides the decoded 360-degree video data and/or 360-degree image data to a user through a display. In this case, the display may be a display for supporting VR or a general display.

VR application for performing communication with the aforementioned processes of the reception side may exist in the VR device or receiver according to some embodiments of the present invention. Also, Loudspeakers/headphones, Display, and Head/eye tracking may be performed by an external device of the VR device or VR application. As described above, the Head/eye tracking component may generate orientation/viewport metadata and provide signaling information in decoding and file/segment decapsulation operations according to some embodiments of the present invention.

In accordance with these operations, the VR device according to some embodiments of the present invention may reduce necessary memories and complexity when a thumbnail for the VR-degree 360 video is extracted.

Figure 24:
FIG. 24 shows an example of projection schemes in a format of VR 360-degree video.

FIG. 24 shows an example of projection schemes in a format of VR 360-degree video.

That is, FIG. 24 shows an embodiment of a VR 360-degree video format according to some embodiments of the present invention. In detail, FIG. 24 shows equi-rectangular, cubic, and icosahedron as formats mainly used in the VR 360-degree video.

The equi-rectangular, cubic, and icosahedron videos may be encoded after being packed using various region-wise packing methods as shown in FIG. 24. At this time, in order to improve encoding efficiency of the encoder, an area having low importance is subjected to downsampling to reduce a size of the video, and the video is converted using a method such as rotation and rearrangement such that portions having high similarity between pixels may spatially adjacent to each other in the packing process.

In other words, FIG. 24 shows a VR 360-degree image or VR 360-degree video to which the aforementioned projection scheme is applied, in a format used in the VR 360-degree video. As described above, the projection processor of the 360-degree video transmission apparatus may project the stitched 360-degree video data on a 2D image. In this process, various projection schemes may be used. As described above, in one embodiment, the projection scheme may be determined based on the projection_scheme field.

Equirectangular is one embodiment of the aforementioned projection scheme (or format). That is, the stitched 360-degree video data, projection may be performed in such a manner that spherical coordinates are converted to planar coordinates. One embodiment of a format of the VR 360-degree video may be a video to which Equirectangular projection scheme is applied. That is, the projection processor according to some embodiments of the present invention may perform projection by using the equirectangular projection scheme.

Cubic is another embodiment of the aforementioned projections scheme (or format). That is, the stitched 360-degree video data may be displayed on a spherical surface. The projection processor may project the 360-degree video data on the 2D image by splitting the 360-degree video data into Cube type. One embodiment of a format of the VR 360-degree video may be a video to which Cubic projection scheme is applied. That is, the projection processor according to some embodiments of the present invention may perform projection by using the cubic projection scheme.

Icosahedron is still another embodiment of the aforementioned projections scheme (or format). That is, the stitched 360-degree video data may be displayed on the icosahedron. One embodiment of a format of the VR 360-degree video may be a video to which Icosahedron projection scheme is applied. That is, the projection processor according to some embodiments of the present invention may perform projection by using the icosahedron projection scheme.

In addition, the format of the VR 360-degree video may be projected in various ways in accordance with the aforementioned projection schemes.

In accordance with these operations, the VR device according to some embodiments of the present invention may reduce necessary memories and complexity when a thumbnail for the VR-degree 360 video is extracted.

Figure 25:
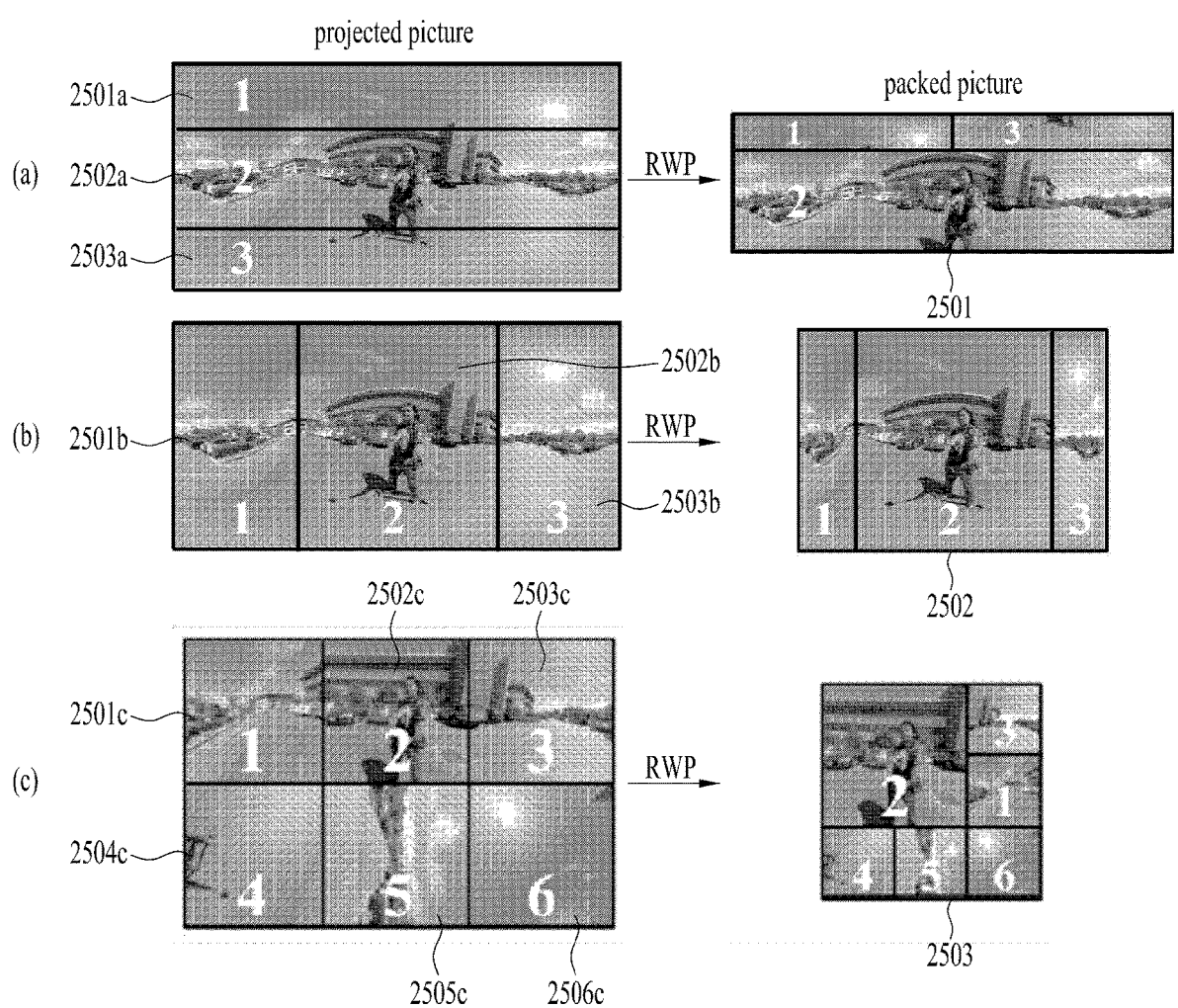
FIG. 25 illustrates a region-wise packing method according to some embodiments of the present invention.

FIG. 25 illustrates a region-wise packing method according to some embodiments of the present invention.

The region-wise packing (RWP) process is a process for improving coding efficiency by setting a rate of video information differently depending on importance in the VR 360-degree video. This region-wise packing (RWP) method is categorized into various methods in accordance with types of VR 360 camera and packing method.

In other words, the video data projected on the 2D image may be subjected to the region-wise packing to improve video coding efficiency. The region-wise packing may mean a process of processing the video data projected on the 2D image per region. In accordance with the embodiments, regions may be identified in accordance with the projection scheme. The region-wise packing process is optional, and may be omitted during a preparation process. In accordance with the embodiments, this process may include a process of rotating each region or rearranging each region on the 2D image to enhance video coding efficiency.

In detail, three embodiments of the region-wise packing according to some embodiments of the present invention are proposed in FIG. 25.

As shown in FIG. 25(a), the region-wise packing according to some embodiments of the present invention may split the VR 360-degree projected picture into three regions 2501a, 2502a and 2503a and generate a packed picture by performing packing in accordance with importance of each region. In one embodiment, since the first region 2501a indicating a simple video/image such as sky and the third region 2503a indicating simple a video/image such as floor may not be important portions, packing may be performed for the videos/images by making sizes of the corresponding regions be smaller than the size of the second region (2501).

Likewise, as shown in FIG. 25(b), the region-wise packing according to some embodiments of the present invention may split the VR 360-degree projected picture into three regions 2501b, 2502b and 2503b and perform packing in accordance with importance of each region. In one embodiment, since the first region 2501b and the third region 2503b indicating videos/images having less information or similarity may not be important portions, packing may be performed for the videos/images by making sizes of the corresponding regions be smaller than the size of the second region (2502).

Also, as shown in FIG. 25(c), the region-wise packing according to some embodiments of the present invention may split the region into same sizes (2501c, 2502c, 2503c, 2504c, 2505c, and 2506c), or may rearrange the split regions through rotation (2504c, 2505c, and 2506c). Also, if the above regions are subjected to packing, packing may be performed for the relatively important portion 2502c in a large image, and may be performed for the other relatively less important portions in small images (2503).

In accordance with these operations, the VR device according to some embodiments of the present invention may reduce necessary memories and complexity when a thumbnail for the VR-degree 360 video is extracted.

FIG. 26 shows an example of ROI which will be used as a thumbnail during encoding of a tile basis according to some embodiments of the present invention.

ROI in the VR 360-degree video may be changed depending on time, and information related to thumbnail extraction ROI may be delivered thereto every frame. The information related to thumbnail extraction ROI may be delivered to the decoder by being included in the video bitstreams, by using SEI message. This ROI related information may be set in a tile basis or tile group basis and then included in SEI message. The decoder may extract only a region corresponding to ROI by decoding corresponding SEI message information and then decode the extracted region.

In order that ROI based decoding is performed, contents may be tile based encoded contents. Also, the ROI information may be transmitted by being included in bitstreams.

The video packed using the OMAF standard, as shown in FIG. 26, may be split on a tile basis or tile group (A, B, C and D) basis and then encoded. An aspect ratio of each title may be a randomly designated value, and may be equally applied to all tiles. Alternatively, the aspect ratio may be different for each tile, and may be included in the bitstreams. One tile may be split into one or more coding tree blocks (CTBs) 2603 and then coded.

Since each tile has no dependency with its neighboring tile, independent encoding or decoding may be performed for each tile, whereby the respective tiles may be decoded in parallel. If specific information on a tile that includes a partial region (for example, ROI and viewport) which will be used as thumbnail among full VR 360-degree videos is transmitted together with metadata, since a thumbnail extractor has only to decode only the corresponding partial region, memories required for extraction of the thumbnail and complexity may be reduced.

That is, as shown in FIG. 26, emphasized time regions (tiles (0,6) and (1,6) in tile group B and tiles (2,3), (2,4), (2,5), (3,3), (3,4), (3,5) in tile group D) in the video split on a tile basis may be videos which will be used for thumbnail extraction. This information related to thumbnail extraction ROI (for example, viewport) may be included in the bitstreams.

In other words, the tiles meant in FIG. 26 may be tiles meant in FIG. 7. That is, 360-degree video data projected on the 2D image or the 360-degree video data for which region-wise packing is performed may be split into one or more tiles or tile groups. The tile group may mean one or more tiles.

That is, the 360-degree video data (360-degree video streams) may be split into one or more tiles. Each tile may independently be encoded or decoded.

If the tiles included in the 360-degree video data are encoded in accordance with the embodiments of the present invention, coded bits of each tile may be varied depending on complexity in the corresponding 360-degree video data (or 360-degree video). For example, since a portion having simple video property such as sky has low video complexity, the portion may have low coded bits.

The 360-degree video data (2601) for which projection and region-wise packing are performed indicate the 360- degree video data for which the projection and region-wise packing according to some embodiments of the present invention are performed.

The 360-degree video data (2602) split into a plurality of tiles, for which projection and region-wise packing are performed, indicate that the 360-degree video data (2601), for which the projection and region-wise packing according to some embodiments of the present invention are performed, are split to tiles or tile groups to perform encoding or decoding on a tile basis or tile group basis.

In one embodiment, encoding or decoding may be performed for the 360-degree video data (2601) for which projection and region-wise packing are performed, on a basis of a plurality of tiles or a group of the tiles. In one embodiment, the 360-degree video data may be split into four rows and six columns to configure tiles. Each tile may mean a tile split by segmenting the tiles of the 360-degree video data (2601) for which the projection and region-wise packing according to some embodiments of the present invention are performed. In other words, in one embodiment, although the respective tiles may have the same size, or their sizes may not be equal to each other. Also, each tile or tile group may be split by further segmentation. Also, encoding or decoding may be performed on a tile group basis including of one or more tiles.

A Coding Tree Block (CTB) 2603 may mean a basis of an encoded area if each tile is encoded. That is, one tile may be split into a plurality of CTBs, whereby encoding may be performed for each of the CTBs.

In this case, ROI which will be used as thumbnail according to some embodiments of the present invention may be determined on a tile basis. In one embodiment, ROI which will be used as thumbnail according to some embodiments of the present invention may be determined by tiles (0,6) and (1,6) in a tile group B and tiles (2,3), (2,4), (2,5), (3,3), (3,4), and (3,5) in a tile group D.

However, in order to extract thumbnail from the VR 360-degree video, a significant thumbnail may be extracted from a final VR 360-degree video after de-packing due to a video format (for example, FIG. 25) packed in a complex type. However, since the VR 360-degree video is processed with resolution of 8K and de-packing is required, a problem may occur in that many memories and extraction time may be increased to quickly extract thumbnails for several VR 360-degree videos. Therefore, the present specification proposes a method for efficiently extracting a thumbnail for VR 360-degree video in VR 360-degree thumbnail extraction according to some embodiments of the present invention.

Additionally, a basic video region used as ROI or thumbnail may be changed depending on time, and in this case, the information related to thumbnail extraction ROI may be delivered every frame. At this time, the determined thumbnail may configure a plurality of images, or may be comprised of a video image. The thumbnail configuring a plurality of images or comprised of a video image may be called a motion thumbnail. The thumbnail described in this specification may be construed to include a motion thumbnail.

The thumbnail for the VR 360-degree video may be sufficient by displaying an important partial area among the full VR 360-degree videos. At this time, the partial area may be a region of interest (ROI) that means users' region of interest. That is, if the user already knows the ROI region or may derive the ROI region through another parameter, the time required to extract the thumbnail may be reduced remarkably.

Therefore, embodiments of a method for deriving ROI will be proposed hereinafter. Information on the ROI may be derived through various methods including the following method.

Firstly, the information on the ROI may be derived through RWP parameter. For example, since a region which is not down-sampled through the RWP process may include an important video, a region (or a region having no size change, or a region of which size is smaller than that of the other area) of which size is not reduced during the RWP process may be set to the ROI. In one embodiment, in the ISO/IEC 14496-10 H.264/AVC or ISO/IEC 23008-2 HEVC standard, if packed_picture_width and packed_picture_height fields have values equal to or greater than those of proj_picutre_width and proj_picture_height in Region-wise packing SEI message, since these fields are important regions, the fields may be set to the ROI. The down-sampling may mean the down scaling.

In other words, ROI which is used as thumbnail or becomes base of thumbnail or a region of a video which becomes a base used as thumbnail may mean a region for which down-sampling is not performed or a region which is less down-sampled, during region-wise packing according to some embodiments of the present invention. That is, the region may mean a region of which size is not reduced during the region-wise packing process. The VR device according to some embodiments of the present invention may determine whether downsampling is performed per region or a type of downsampling which is performed, based on a parameter related to region-wise packing.

Secondly, random Motion-constrained tile sets (MCTS) sub bitstreams among sub bitstreams extracted in accordance with MCTS sub-bitstream extraction process of the ISO/IEC 23008-2 HEVC standard may be set to ROI region or a region of a video which becomes a base used as thumbnail.

Thirdly, when VR 360-degree video service is provided through Dynamic Adaptive Streaming over HTTP (DASH) protocol, information on ROI may be included in Media Presentation Description (MPD), and ROI or a region of a video which becomes a base used as thumbnail may be set through information on the MPD.

Fourthly, the information on ROI may set a full video delivered through a streaming service to ROI or a region of a video which becomes a base used as thumbnail. Also, a portion of the full video may be set to ROI or a region of a video which becomes a base used as thumbnail.

Fifthly, in case of VR 360-degree video including overlay, since an overlaid region is used for advertisement, the region may be an important portion. Therefore, the overlaid region may be set to ROI.

In other words, the 360-degree video bitstreams according to some embodiments of the present invention may include an overlay region. If the 360-degree video bitstreams include one or more overlay regions, some or all of the corresponding one or more overlay regions may be used as ROI or a region of a video which becomes a base used as thumbnail. Overlay may mean a piece of visual media rendered over omnidirectional video or image item or over a viewport. In one embodiment, overlay may mean corresponding advertisement or video when advertisement or additional video is inserted into VR 360-degree video. The overlay region may mean a region into which the aforementioned overlay is inserted (or rendered). That is, the VR device according to some embodiments of the present invention may insert image or video image (advertisement, etc.) into the aforementioned overlay region after decoding VR 360-degree video.

Sixthly, as shown in FIG. 25, in contents coded by being split on a tile basis, coded bits of each tile may be varied depending on complexity within the video. For example, since a portion having simple video property such as sky has low video complexity, the amount of coded bits may be small. Since ROI or a region of a video which becomes a base used as thumbnail may be a portion having high video complexity, a portion of a tile, which has the amount of coded bits more than that of the other tiles, may be set to ROI.

In other words, if the aforementioned projected or region-wise packed 360-degree video are split into a plurality of tiles or groups of tiles and then encoded or decoded, one or more tiles or groups of tiles, which have the great amount of coded bits, among the corresponding tiles or groups of tiles, may be determined as ROI or a region of a video which becomes a base used as thumbnail.

On the contrary, if the VR device according to some embodiments of the present invention receives 360-degree video bitstreams corresponding to a plurality of tiles or groups of tiles, one or more tiles or groups of tiles, which have the great amount of coded bits, may be determined as ROI. In one embodiment, the VR device may preset minimum coded bits for determining ROI and set a tile, which has bits more than the preset minimum coded bits, among the plurality of tiles included in the received 360-degree video bitstreams, to ROI.

In accordance with these operations, the VR device according to some embodiments of the present invention may reduce necessary memories and complexity when a thumbnail for the VR-degree 360 video is extracted. Also, this configuration may remarkably reduce the time required to extract a significant thumbnail by means of the VR device according to some embodiments of the present invention.

Figure 27:
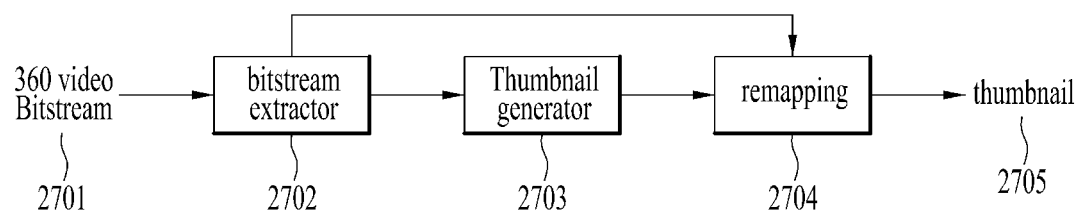
FIG. 27 shows a VR device according to some embodiments of the present invention.

FIG. 27 shows a VR device according to some embodiments of the present invention.

FIG. 27 shows an architectural view of a VR device according to some embodiments of the present invention, which extracts thumbnail from 360-degree video data (or 360-degree video bitstreams). In FIG. 27, a bitstream extractor receives 360 video bitstreams and extracts sub-bitstreams of a portion corresponding to ROI. In one embodiment, the bitstream extractor may parse SEI message indicating a position of the portion corresponding to the ROI in the 360-degree video bitstreams, and may output sub-bitstreams of tiles corresponding to the ROI. In another embodiment, the bitstream extractor may output random MCTS sub-bitstreams in accordance with the MCTS sub-bitstream extraction process of the ISO/IEC 23008-2 HEVC standard. A thumbnail generator decodes input sub-bitstreams and then outputs a restoration video (or restoration data for the ROI) for the ROI. A remapping block rotates/upsamples/rearranges the restoration video by using unpacking information received from the bitstream extractor and then outputs significant thumbnail video or thumbnail.

Also, an overlay image may be blended in the VR 360-degree video and then output. In this case, the overlay image may be used for various VR applications such as advertisement and location based services. When thumbnail for the VR 360-degree video including overlay is extracted, the overlay image may not be used for thumbnail extraction to quickly extract the thumbnail. Alternatively, the overlay image and the thumbnail image may be blended with each other and then a final thumbnail image may be output.

In other words, the VR device according to some embodiments of the present invention may include a receiver for receiving 360-degree video bitstreams, a bitstream extractor for extracting sub-bitstreams included in the 360-degree video bitstreams, a thumbnail generator for generating restoration data for the ROI from the corresponding sub-bitstreams, and a remapping block for generating thumbnail data by remapping the restoration data for the ROI based on signaling information. At this time, the remapping block according to FIG. 27 may be called a remapper.

The VR device may mean the aforementioned OMAF player or a VR service platform.

The receiver may receive the 360-degree video bitstreams (2701). The receiver may deliver the received 360-degree video bitstreams to the bitstream extractor 2702. Hereinafter, the 360-degree video bitstreams described in this specification may mean data corresponding to the aforementioned 360-degree video or the aforementioned 360-degree video data. Also, the 360-degree video bitstreams described in this specification may be called VR 360-degree video, VR 360-degree video bitstreams, VR 360-degree video, etc.

The bitstream extractor 2702 may extract sub-bitstreams included in the 360-degree video bitstreams from the 360-degree video bitstreams received by the receiver. In this case, the sub-bitstreams may mean bitstreams corresponding to ROI for the 360-degree video bitstreams (or 360-degree video data, VR 360-degree video, etc.). That is, the bitstream extractor 2702 extracts sub-bitstreams indicating bitstreams corresponding to the ROI from the received 360-degree video bitstreams. That is, the sub-bitstreams include the ROI.

Also, the 360-degree video bitstreams may include information for extracting the ROI or signaling information for restoring the ROI. The bitstream extractor 2702 according to some embodiments of the present invention may further extract signaling information included in the 360-degree video bitstreams. That is, the 360-degree video bitstreams may include signaling information for generating thumbnail data by remapping the restoration data for the ROI. In one embodiment, the aforementioned signaling information may include related information for performing unpacking for the 360-degree video bitstreams.

In one embodiment, if the 360-degree video bitstreams are encoded 360-degree video data on a tile basis, the bitstream extractor 2702 may extract only sub-bitstreams corresponding to a tile corresponding to the ROI from the whole bitstreams (that is, 360-degree video bitstreams) of the VR 360-degree video. At this time, information on the tile corresponding to the ROI may be delivered every frame (picture), and may be delivered through SEI message included in the 360-degree video bitstreams.

The thumbnail generator 2703 may generate restoration data for ROI by receiving the sub-bitstreams extracted from the bitstream extractor 2702. The thumbnail generator may perform decoding or video decoding according to some embodiments of the present invention for the aforementioned sub-bitstreams. That is, the thumbnail generator 2703 may extract restoration data for ROI by decoding the sub-bitstreams including ROI. In this case, the restoration data for ROI may mean data prior to unpacking of ROI for use in thumbnail.

The remapping block 2704 may perform unpacking and/or rotation/upsampling/rearrangement for the restoration data for ROI by receiving the restoration data for ROI output from the thumbnail generator 2703. At this time, the remapping may be performed based on related information for performing unpacking for the 360-degree video bitstreams corresponding to the aforementioned signaling information. The remapping block 2704 according to some embodiments of the present invention may extract a significant thumbnail 2705 by performing unpacking and/or rotation/upsampling/rearrangement for the restoration data for ROI. The remapping 2704 according to some embodiments of the present invention may be performed by the remapper.

The remapping 2704 according to some embodiments of the present invention may include unpacking, editing, upscaling, downscaling, composition or rendering according to some embodiments of the present invention, as described above.

In accordance with these operations, the VR device according to some embodiments of the present invention may reduce necessary memories and complexity when a thumbnail for the VR-degree 360 video is extracted.

Hereinafter, a method for extracting thumbnail in various VR 360 service systems for providing VR 360-degree video will be described.

Figure 28:
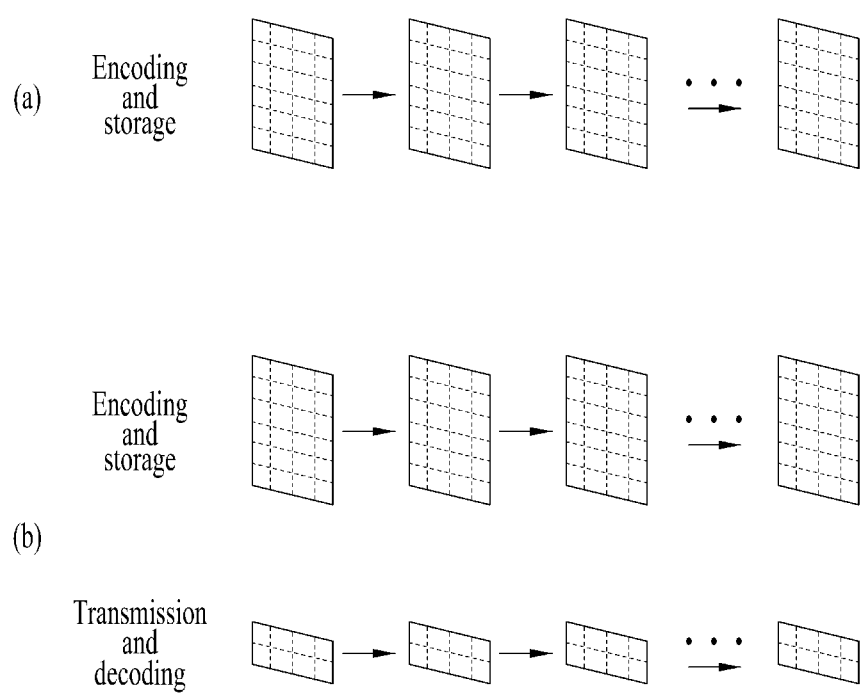
FIG. 28 shows an embodiment in which the VR device according to some embodiments of the present invention transmits and stores VR 360-degree video data encoded based on a tile.

FIG. 28(*a*) shows an embodiment in which the VR device according to some embodiments of the present invention transmits and stores VR 360-degree video data encoded based on a tile.

That is, FIG. 28(*a*) shows an example of encoding and storage of tile based VR 360-degree video. FIG. 28(*a*) shows that tiles are identified by dotted lines and encoding is performed in time sequence. Sub-bitstreams for the tile corresponding to the ROI are extracted from the tile based VR 360-degree bitstreams (that is, 360-degree video bitstreams) which are stored, and then decoded to output a thumbnail. In this case, information on the tile corresponding to the ROI may be delivered every frame (picture), and may be delivered through an external delivery medium or SEI message. Methods of FIG. 31, FIG. 32 and FIG. 33, which will be described later, may be used for delivery of the ROI information through the external delivery medium. Finally, remapping may selectively be applied depending on a packed type.

In other words, if the VR 360-degree video is configured based on a plurality of tiles, the transmitter or VR device according to some embodiments of the present invention may perform encoding according to some embodiments of the present invention for each tile or each of groups of tiles.

On the contrary, if the 360-degree video bitstreams are bitstreams of the VR 360-degree video configured based on a plurality of tiles, decoding according to some embodiments of the present invention may be performed for each tie or each of groups of tiles. Signaling information on each tile or group of tiles may be delivered every frame in the receiver or VR device according to some embodiments of the present invention. At this time, the signaling information may be transmitted through SEI message included in the 360-degree video bitstreams, and may be delivered based on methods which will be described later.

FIG. 28(*b*) shows an embodiment in which the VR device according to some embodiments of the present invention transmits, stores and decodes VR 360-degree video data encoded based on a tile.

That is, FIG. 28(*b*) shows an example of transmission and decoding of VR 360-degree video encoded based on tile. FIG. 28(*b*) shows a transmission system that transmits only a portion corresponding to ROI among the VR 360-degree bitstreams encoded based on tile, to decode the portion. Since bitstreams for tile corresponding to ROI are only transmitted from this system, the corresponding region may be decoded without passing through the bitstream extractor, and then remapping may selectively be applied to output thumbnail.

In other words, if the VR 360-degree video is configured based on a plurality of tiles, the transmitter or VR device according to some embodiments of the present invention may perform encoding according to some embodiments of the present invention for each tile or each of groups of tiles. On the contrary, if the 360-degree video bitstreams are bitstreams of the VR 360-degree video configured based on a plurality of tiles, decoding according to some embodiments of the present invention may be performed for each tile or each of groups of tiles in the receiver or VR device according to some embodiments of the present invention.

At this time, the transmitter or VR device according to some embodiments of the present invention may transmit only bitstreams corresponding to ROI among bitstreams corresponding to a plurality of encoded tiles or groups of tiles. That is, the 360-degree video bitstreams may include only sub-bitstreams which are bitstreams corresponding to ROI.

On the contrary, the receiver or VR device according to some embodiments of the present invention may receive bitstreams corresponding to ROI and/or 360-degree video bitstreams including only signaling information. Therefore, the receiver or VR device according to some embodiments of the present invention may perform decoding for the bitstreams corresponding to ROI and/or the 360-degree video bitstreams including only signaling information. In this case, the bitstream extractor according to some embodiments of the present invention may be omitted. Also, the VR device according to some embodiments of the present invention may perform the operation of the thumbnail generator and the operation of remapping according to some embodiments of the present invention.

This configuration allows a transmission bandwidth to be managed more effectively than transmission of bitstreams for a full video because the bitstreams for ROI are only transmitted through a network. That is, VR 360-degree video service may be provided at a low bandwidth.

Figure 29:
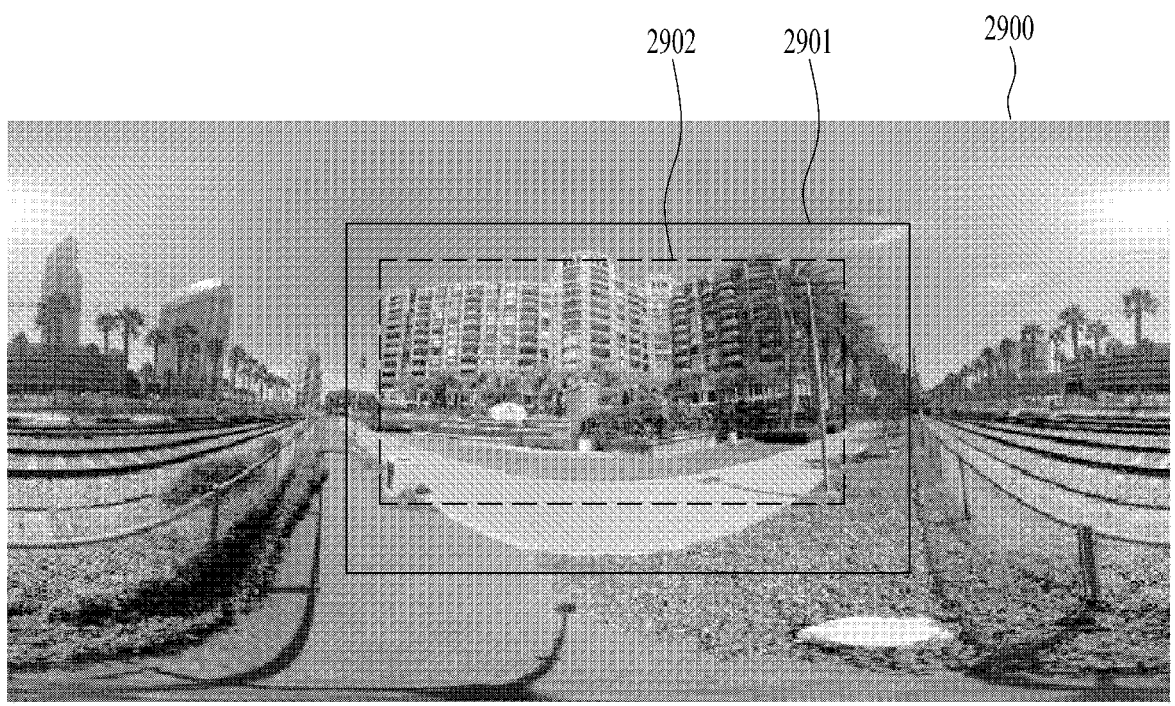
FIG. 29 shows an embodiment of ROI for thumbnail extraction in the VR device according to some embodiments of the present invention.

FIG. 29 shows an embodiment of ROI for thumbnail extraction in the VR device according to some embodiments of the present invention.

In FIG. 29, a solid line denotes a transmission region through a network, and a dotted line denotes ROI actually displayed for a viewer. The number of tiles transmitted through a network may be equal to or more than the number of tiles for the ROI. In this case, since a region wider than a viewer viewport, although not a full region, has been already decoded, processing for an immediate reaction may partially be performed. In this system, thumbnail extraction may be performed in such a manner that tile bitstreams for ROI (or inner region of ROI) are output as sub-bitstreams through the bitstream extractor, the sub-bitstreams are decoded and then remapping is selectively applied to output thumbnail.

In other words, FIG. 29 shows a stitched video 2900. The stitched video 2900 described in FIG. 29 may mean the stitched video 2200 of FIG. 22. That is, the stitched video 2900 indicates image/video for which the stitching process according to some embodiments of the present invention is performed or image data or video data for which the projection according to some embodiments of the present invention is performed.

A receiving region 2901 may mean a region (that is, a solid line region in FIG. 29) of the VR 360-degree video corresponding to the 360-degree video bitstreams transmitted through a network. That is, the VR device according to some embodiments of the present invention may receive the 360-degree video bitstreams including bitstreams of data corresponding to a region in a red solid line.

A viewing region 2902 is ROI according to one embodiment, and denotes a region where a user views a video. The 360-degree video bitstreams transmitted through a network may include video for a region wider than the ROI. That is, if the dotted line region 2902 in FIG. 29 is ROI for use in thumbnail, the sub-bitstreams may mean bitstreams corresponding to the dotted line region 2902, and the 360-degree video bitstreams transmitted through a network may mean bitstreams corresponding to the solid line region 2901 wider than the portion marked with the dotted line.

If the VR 360-degree video is configured based on tile, the number of tiles included in the 360-degree video bitstreams or sub-bitstreams transmitted through a network may be equal to or more than the number of tiles corresponding to the ROI.

Through this configuration, the VR device according to some embodiments of the present invention may process an immediate reaction for a viewer's quick viewpoint movement.

Figure 30:
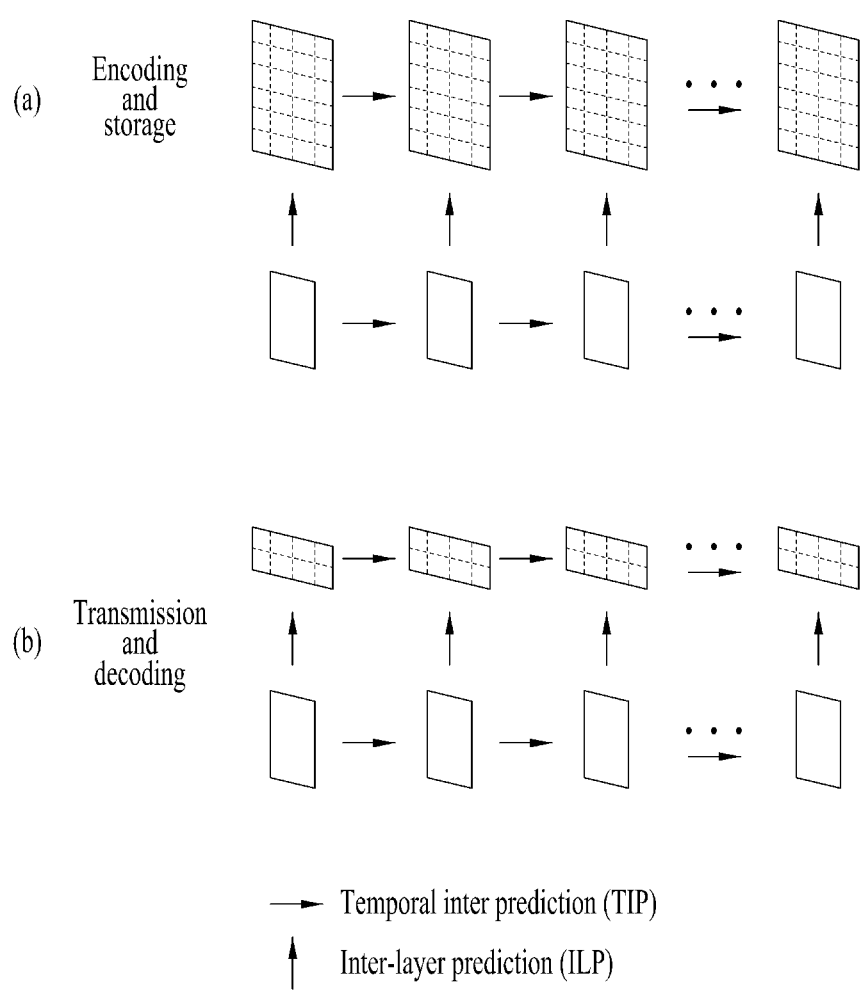
FIG. 30 shows a scalable coding scheme of the VR device according to one embodiments of the present invention.

FIG. 30 shows a scalable coding scheme of the VR device according to one embodiments of the present invention.

That is, FIG. 30 shows VR 360-degree video service using a scalable coding scheme. In FIG. 30, the VR device according to some embodiments of the present invention may provide an immediate reaction for a viewer's quick viewpoint movement by transmitting a full VR 360-degree video of low resolution. For a viewer's quick viewpoint movement, after a video service of low resolution is provided, a video service of high resolution is updated. The video of low resolution may be referred to as a video of a base layer, and the video of high resolution may be referred to as a video of an enhancement layer. The number of the enhancement layer may be minimum 1 or more depending on the number of resolutions.

Thumbnail extraction in this system may be performed through only VR 360-degree video of low resolution. That is, since a size of a thumbnail which is output is smaller than that of an actual video, after sub-bitstreams for the portion corresponding to the ROI are extracted from the full VR 360-degree video of low resolution and then decoded, remapping may selectively be applied to output a thumbnail.

In the system of FIG. 30, the VR 360-degree video of high resolution may be restored with reference to the VR 360-degree video of low resolution. The VR 360-degree video of low resolution may previously be restored to output the VR 360-degree video of high resolution.

In short, the transmitter or VR device according to some embodiments of the present invention may perform encoding for the 360-degree video data based on a scalable coding scheme. The aforementioned scalable video coding method or scalable video coding scheme may mean a scalable video coding method according to the video compression standard of H.264/MPEG-4 AVC.

FIG. 30(*a*) shows that VR 360-degree video which is not encoded is encoded in accordance with the scalable coding scheme. The encoded 360-degree video bitstreams may include a base layer that includes VR 360-degree video data of low resolution and/or an enhancement layer that includes VR 360-degree video data of high resolution. At this time, the number of the enhancement layer may be one or more depending on the number of resolutions.

FIG. 30(*b*) shows that the VR device according to some embodiments of the present invention receives 360-degree video bitstreams and decodes the received 360-degree video streams in accordance with the scalable coding scheme. The VR device according to some embodiments of the present invention may perform inter-layer prediction (ILP) for the VR 360-degree video of low resolution included in the aforementioned base layer. The inter-layer prediction may mean prediction of higher spatial resolution or quality signal by means of low spatial resolution or quality signal.

The VR device according to some embodiments of the present invention may perform inter-prediction for blocks of the VR 360-degree video. The inter-prediction may mean prediction from decoded samples of a current decoded picture and the other reference pictures. The inter-prediction is a direct prediction and may mean temporal inter-prediction (TIP).

In accordance with these operations, the VR device according to some embodiments of the present invention may reduce necessary memories and complexity when a thumbnail for the VR-degree 360 video is extracted. Also, through this configuration, the VR device according to some embodiments of the present invention may process an immediate reaction for a viewer's quick viewpoint movement.

Hereinafter, a transcoding method of a tile based VR 360-degree video provided through adaptive streaming services will be described.

The tile based VR 360-degree video may be provided to a viewer through adaptive streaming services. In this case, thumbnail may be delivered from a server to each device and then displayed for a viewer. Examples of the adaptive streaming services may include Dynamic Adaptive Streaming over HTTP (DASH), HTTP Live Streaming (HLS) of Apple, and HTTP Dynamic Streaming (HDS) of Adobe.

The tile based VR 360-degree video provided through the adaptive streaming services may be converted in the form of storage file and then stored in the device, and may be viewed by a viewer in an off-line state. At this time, the tile based VR 360-degree video may be converted using MP4 or MKV (WebM) and TS file format and then stored, and may be stored by further including information on the ROI. In the information on the ROI, either the full video delivered through the streaming service may be set to the ROI or a portion of the full video may be set to the ROI. In this case, the methods of FIG. 31, FIG. 32 and FIG. 33 may be used for storage of the ROI. Hereinafter, the method for storing ROI will be described in detail.

The information on the ROI in the tile based VR 360-degree video provided through the adaptive streaming service may be delivered from the server. For example, when the VR 360-degree video service is provided through a DASH protocol, the information on the ROI may be included in Media Presentation Description (MPD). The MPD is a meta file or manifest file, which includes information on information configuration of media. The MPD may include information such as the number of videos and audios, resolution codec, and bit rate.

In other words, if the 360-degree video bitstreams according to some embodiments of the present invention are received based on a Dynamic Adaptive Streaming over HTTP (DASH) protocol, Media Presentation Description (MPD) delivered by the DASH protocol may include the information on the ROI.

Since media data suitable for a network status are delivered from the server in the adaptive streaming services, a viewer may receive a video service without buffering (video buffering).

Also, the 360-degree video bitstreams provided through the adaptive streaming services may be a file format type that may be stored. In one embodiment, the 360-degree video bitstreams may be data stored based on one of MP4 file format, MKV file format and TS file format, and may further include the information on the ROI in each file format.

As the 360-degree video streams are stored in the form of the storage file format as above, the VR device according to some embodiments of the present invention may allow a viewer to view the VR 360-degree video even in an off-line state.

Therefore, in the VR device or transmitter/receiver according to some embodiments of the present invention, the embodiments in which RO information from the tile based VR 360-degree video is stored in the form of a storage file will be described.

FIG. 31 shows an embodiment of a format for storing RO information and signaling information by using the MP4 standard in the VR device according to some embodiments of the present invention.

The tile based VR 360-degree video may be stored in MP4 file by using the ISOBMFF standard. All tiles may be stored in one 'trak' box. Alternatively, several tiles may be grouped in one tile group, whereby one tile group may be stored in one 'trak' box, and several 'trak' boxes may be generated depending on the number of tile groups. Alternatively, each tile may be stored in each 'trak' box, and several 'trak' boxes may be generated depending on the number of tiles.

At this time, the information on the ROI may be designated on a tile basis.

In one embodiment, FIG. 31 shows an embodiment in which RO information is stored and signaled using 'wwpt' box. First of all, the total number of tiles split into columns and rows in the full video may be delivered. A value of 'have_tile_information' is initially set to '0', and is reset to '1' if the total number of tiles is set. 'num_tile_columns' indicates the number of tiles in a column direction. 'num_tile_rows' indicates the number of tiles in a row direction. 'viewport_tile' indicates information as to whether each tile corresponds to the ROI. For example, in a lower part of FIG. 25, the ROI may be set to '1' when values of (i,j) in viewport_tile[i][j] are (0,6), (1,6), (2,3), (2,4), (2,5), (3,3), (3,4), and (3,5). Various modifications may be applied to the method for indicating tile based ROT. If each tile is signaled in the form of tile group, information as to a tile group in which the RO is included may further be delivered.

The information on the ROI may be arranged in a file prior to all 'trak' boxes, and may be arranged on the same layer as the 'trak' box or the same layer as a container layer that includes 'trak' box as a higher layer. For example, the information on the ROI may be arranged on the same layer as 'moov' box or 'moof' box, or may be arranged prior to 'moov' box or 'moof' box. If the information on the ROI is first parsed, since bitstreams for a specific trak have only to be extracted, complexity for parsing may be reduced. The ROI information may be delivered every frame (video, picture), and may be delivered every certain time interval. That is, one or more values of 'num_tile_columns', 'num_tile_rows', and 'viewport_tile' in 'vwpt' may exist depending on the number of frames.

In short, 'have_tile_information' is initially set to '0', and is reset to '1' if the total number of tiles is set.

'num_tile_columns' may mean the number of columns of tiles split from the VR 360-degree video.

'num_tile_rows' may mean the number of rows of tiles in the VR 360-degree video.

'viewport_tile' indicates information as to whether the tiles split from the VR 360-degree video respectively correspond to the ROI.

In accordance with these operations, the VR device according to some embodiments of the present invention may reduce necessary memories and complexity when a thumbnail for the VR-degree 360 video is extracted.

FIG. 32 shows an embodiment of a format for storing ROI information and signaling information by using Matroska format in the VR device according to some embodiments of the present invention.

The tile based VR 360-degree video may be stored in MKV or WEBM file by using the Matroska format. All tiles may be stored in one 'TrackEntry' element. Alternatively, several tiles may be grouped in one tile group, whereby one tile group may be stored in one 'TrackEntry' element, and several 'TrackEntry' elements may be generated depending on the number of tile groups. Alternatively, each tile may be stored in each 'TrackEntry' element, and several 'TrackEntry' elements may be generated depending on the number of tiles.

At this time, the information on the ROI may be designated on a tile basis.

In one embodiment, FIG. 32 shows an embodiment in which ROI information is stored and signaled using 'viewport', 'numTileColumns', 'numTileRows', and 'TileViewport' elements. If the corresponding contents are encoded based on a tile, ROI information on the tile may be stored in the viewport element and then signaled. The viewport element has an element type of 'm' (master element), and may have a lower-element. For example, the viewport element may have lower-elements of 'numTileColumns', 'numTileRows', and 'TileViewport'. The viewport element may have a unique EBML ID value, and for example, may have a value of [88][D0]. If the viewport element exists, the lower-element may additionally parsed. The numTileColumns element may have a unique EBML ID value to be identified from the other elements, and for example, may have a value of [88][D1]. The numTileColumns element indicates the number of tiles in a column direction, and may have a value of '0' or more. The numTileRows element may have a unique EBML ID value, and for example, may have a value of [88][D2]. The numTileRows element indicates the number of tiles in a row direction, and may have a value of '0' or more. The TileViewport element may have a unique EBML ID value, and for example, may have a value of [88][D3]. Several TileViewport elements may exists as much as the number of tiles, and information as to whether each tile corresponds to the ROI may be stored in a raster order (from left to right, and from up to down). The TileViewport element may have a value of 0 or 1. If the respective tiles are signaled in the form of tile group, information as to a tile group in which the ROI is included may further be delivered.

The information on the ROI may be arranged in a file prior to all 'TrackEntry' elements, and may be arranged on the same level as the 'TrackEntry' element or the same level as an element level that includes the 'TrackEntry' element as a lower level. For example, the information on the ROI may be arranged on the same level as the Tracks element, or may be arranged prior to the Tracks element. If the information on the ROI is first parsed, since bitstreams for a specific trak have only to be extracted, complexity for parsing may be reduced. The ROI information may be delivered every frame, and may be delivered every certain time interval. That is, one or more values of 'numTileColumns', 'numTileRows' and 'TileViewport' in the viewport element may exist depending on the number of frames.

In short, one or more tiles included in the VR 360-degree video may be stored in one 'TrackEntry' element, a tile group of one or more tiles may be stored in one 'TrackEntry' element, and several 'TrackEntry' elements may be generated depending on the number of tile groups.

Segment element may mean a root element that includes any other higher elements (elements defined in only level 1). The Matroska file may be composed of one segment element.

The Tracks element may mean the highest element of information describing a plurality of tracks according to the Matroska format.

The viewport element may be a parameter that means ROI information on one or more tiles (or tile groups) corresponding to the TrackEntry element. In detail, the ROI information of tiles corresponding to the 'TrackEntry' element may be signaled to the lower-element for the 'viewport' element, and examples of the lower-element may include 'numTileColumns', 'numTileRows', and 'TileViewport'.

The numTileColumns element may mean the number of columns of tiles corresponding to the TrackEntry element.

The numTileRows element may mean the number of rows of tiles corresponding to the TrackEntry element.

The TileViewport element may mean a parameter in which information as to whether each of tiles corresponding to the TrackEntry element corresponds to ROI is stored in a raster order (that is, from left to right and from up to down).

The TrackEntry element may be an element describing one track having all lower elements.

The TrackNumber element may mean a number of a track used in a block header.

In accordance with these operations, the VR device according to some embodiments of the present invention may reduce necessary memories and complexity when a thumbnail for the VR-degree 360 video is extracted.

FIG. 33 shows an embodiment of storage and signaling for ROI information by using MPEG-TS format.

The tile based VR 360-degree video may be stored in TS file using the MPEG-TS standard. Bitstreams for each tile may be converted to bytestream format and included in the TS file. The information on the ROI may be stored in the TS file using a specific descriptor and then signaled.

For example, FIG. 33 shows an example of storage and signaling of ROI information using viewport_descriptor( ). A Descriptor_tag value may have a unique value to be identified from the other descriptor_tag values, and for example may have a value of '0xE0'. A Descriptor_length value indicates the number of bytes for information subsequent to the descriptor_length. The 'num_tile_columns' indicates the number of tiles in a column direction. The 'num_tile_rows' indicates the number of tiles in a row direction. The 'viewport_tile' indicates information as to whether each tile corresponds to the ROI.

In one embodiment, the ROI in FIG. 26 may be set to '1' when values of (i,j) in viewport_tile[i][j] are (0,6), (1,6), (2,3), (2,4), (2,5), (3,3), (3,4), and (3,5). Various modifications may be applied to the method for indicating tile based ROI. In this case, 'uimsbf' is an unsigned integer and indicates a format where the Most Significant Bit (MSB) is first arranged. 'bslbf' is a bit string, and indicates a format where a left bit is first arranged. If each tile is signaled in the form of tile group, information as to a tile group in which the ROI is included may further be delivered. The information on the ROI may be arranged in a Program Map Table (PMT) of a file. The ROI information may be delivered every frame, and may be delivered every certain time interval. That is, one or more values of 'num_tile_columns', 'num_tile_rows', and 'viewport_tile' in 'vwpt' box viewport_descriptor( ) may exist depending on the number of frames.

In short, the ROI according to some embodiments of the present invention may be signaled in accordance with values of 'num_tile_columns', 'num_tile_rows' and 'viewport_tile' in 'vwpt' box viewport_descriptor( ) of TS file stored using the MPEG-TS standard. One or more values of 'num_tile_columns', 'num_tile_rows', and 'viewport_tile' in 'vwpt' box viewport_descriptor( ) may exist depending on the number of frames. Each parameter in 'vwpt' box viewport_descriptor( ) may be defined as follows.

The Descriptor_tag value may mean a unique value to be identified from the other descriptor_tag values.

The Descriptor_length value indicates the number of bytes of information subsequent to Descriptor_length.

The 'num_tile_columns' may mean the number of columns of tiles.

The 'num_tile_rows' may mean the number of rows of tiles.

The 'viewport_tile' may mean information as to whether each tile corresponds to the ROI.

In accordance with these operations, the VR device according to some embodiments of the present invention may reduce necessary memories and complexity when a thumbnail for the VR-degree 360 video is extracted.

Figure 34:
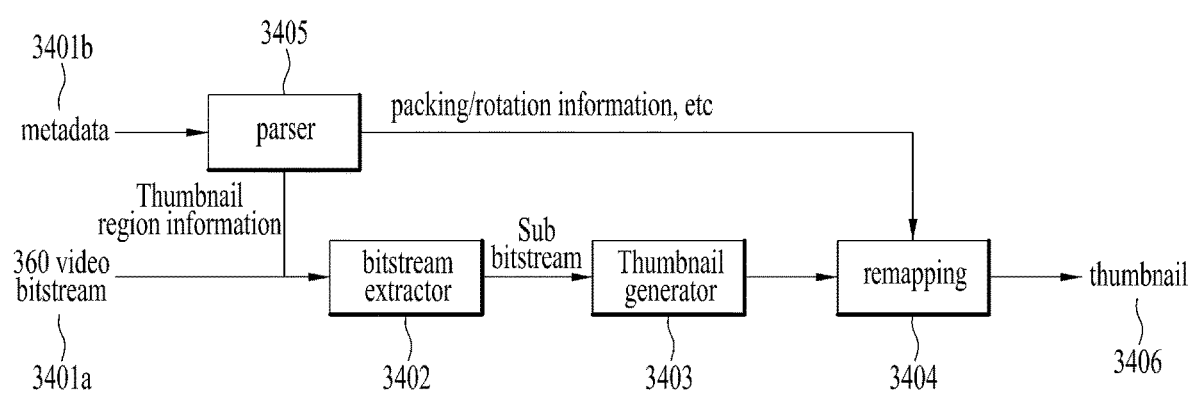
FIG. 34 shows another example of a VR device according to some embodiments of the present invention.

FIG. 34 shows another example of a VR device according to some embodiments of the present invention.

FIG. 34 shows another architectural view of a VR device according to some embodiments of the present invention, which extracts thumbnail from 360-degree video. In FIG. 34, metadata 3401b may be input through an external delivery entity not the 360-degree video bitstreams. As an example of the external delivery entity, the metadata may be stored in a file format such as ISOBMFF in the form of a specific box (for example, 'vwpt' box in FIG. 31) and then delivered. As another example, the methods of FIG. 32 and FIG. 33 may be used to deliver the metadata.

In FIG. 34, the parser reads out contents of the metadata input through the external delivery entity and outputs information on a tile corresponding to ROI or packing/rotation information, etc. The bitstream extractor receives 360 video bitstreams and the information on a tile corresponding to ROI and outputs sub-bitstreams for tiles corresponding to the ROI. The thumbnail generator generates restoration video for ROI by receiving the sub-bitstreams and then decoding the received sub-bitstreams. A remapping block rotates/upsamples/rearranges the restoration video by using packing/rotation information received from the parser and then outputs a significant thumbnail video.

In other words, the VR device according to some embodiments of the present invention may include receivers 4301a and 3401b, a bitstream extractor 3402, a thumbnail generator 3403, a remapping block 3404, and/or a parser 3405. At this time, the remapping block may be called a remapper. The VR device according to some embodiments of the present invention may mean the aforementioned OMAF player or a VR service platform.

In the VR device according to one embodiment proposed in FIG. 34, all or some of the metadata (or signaling information) may be received through the external delivery entity without being received to be included in the 360-degree video bitstreams. That is, in FIG. 34, the receivers 3401a and 3401b may include a first receiver 3401a for receiving the 360-degree video bitstreams and a second receiver 3401*b* for receiving the metadata (or signaling information) received through the separate delivery entity.

The first receiver may deliver the received 360-degree video bitstreams to the bitstream extractor 2702 according to some embodiments of the present invention. The second receiver may deliver the received metadata (or signaling information) to the parser 3405 according to some embodiments of the present invention.

The bitstream extractor 3402 may extract sub-bitstreams included in the 360-degree video bitstreams from the 360-degree video bitstreams received by the first receiver. In this case, the bitstream extractor according to some embodiments of the present invention may extract the sub-bitstreams based on the aforementioned thumbnail region information.

Also, the receiver or VR device according to some embodiments of the present invention may receive bitstreams corresponding to the ROI and/or the 360-degree video bitstreams including only signaling information. Therefore, the receiver or VR device according to some embodiments of the present invention may perform decoding for the bistreams corresponding to the ROT and/or the 360-degree video bitstreams including only signaling information. In this case, the bitstream extractor 3402 according to the embodiment of the present invention may be omitted.

Also, in one embodiment, if the 360-degree video bitstreams are 360-degree video data encoded on a tile basis, the bitstream extractor 3402 according to some embodiments of the present invention may extract only sub-bitstreams corresponding to the tile corresponding to the ROT from the 360-degree video bitstreams.

The thumbnail generator 3403 may generate restoration data for ROT by receiving the sub-bitstreams extracted from the bitstream extractor 3402. The thumbnail generator may perform decoding or video decoding according to some embodiments of the present invention for the aforementioned sub-bitstreams. That is, the thumbnail generator 3403 may extract restoration data for RO by decoding the sub-bitstreams including ROT.

The remapping block 3404 may perform unpacking and/or rotation/upsampling/rearrangement for the restoration video for ROT by receiving the restoration data for ROI output from the thumbnail generator 3403. At this time, the remapping may be performed based on related information for performing unpacking for the 360-degree video bitstreams corresponding to the aforementioned signaling information. The remapping block 3404 according to some embodiments of the present invention may extract a significant thumbnail 3406 by performing unpacking and/or rotation/upsampling/rearrangement for the restoration video for ROT. The remapping 3404 according to some embodiments of the present invention may be performed by the remapper.

The remapping 3404 according to some embodiments of the present invention may include unpacking, editing, upscaling, downscaling, composition or rendering according to some embodiments of the present invention, as described above.

The parser 3405 may parse the metadata received from the second receiver according to some embodiments of the present invention. The parser according to some embodiments of the present invention may deliver all or some of the metadata extracted by parsing the metadata received from the receiver to the bitstream extractor and/or the remapping block according to some embodiments of the present invention. At this time, the metadata may include information related to unpacking for the 360-degree video bitstreams, thumbnail region information which is information for extracting the sub-bitstreams for ROI from the 360-degree video bitstreams received by the first receiver, and packing/rotation information indicating information for extracting thumbnail data from the restoration data for the ROI.

In accordance with these operations, the VR device according to some embodiments of the present invention may reduce necessary memories and complexity when a thumbnail for the VR-degree 360 video is extracted.

Figure 35:
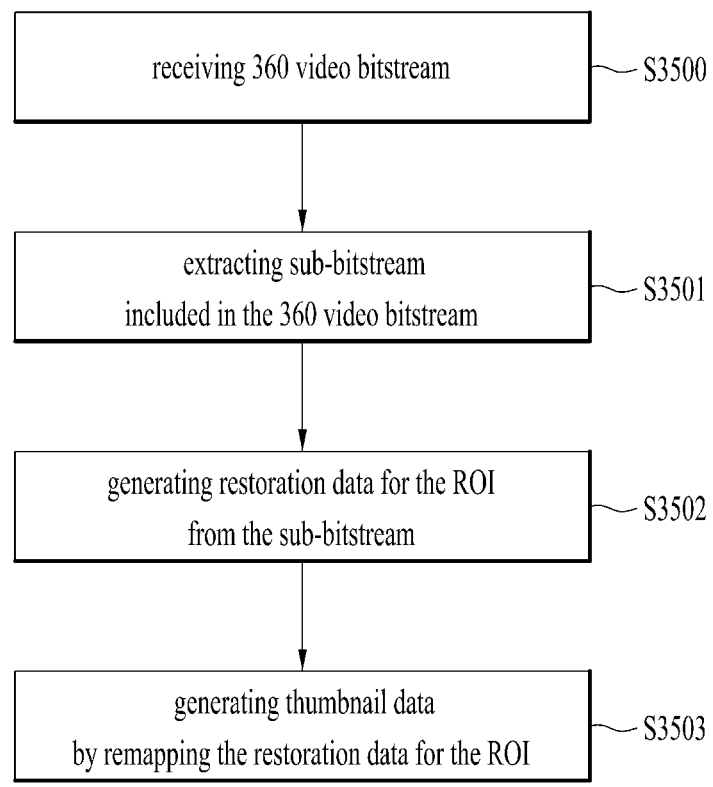
FIG. 35 is a flow chart showing an example of a control method for the VR device according to some embodiments of the present invention.

FIG. 35 is a flow chart showing an example of a control method for the VR device according to some embodiments of the present invention.

The control method for the VR device according to some embodiments of the present invention may receive the 360-degree video bitstreams (S3500). As described above in detail, the 360-degree video bitstreams may include sub-bitstreams indicating ROI. Also, the 360-degree video bitstreams may include the aforementioned signaling information. Also, the signaling information may be received as the metadata (or signaling information) through a delivery entity separately from the 360-degree video bitstreams. The step S3500 may be performed by the receiver according to some embodiments of the present invention. In detail, the 360-degree video bitstreams may be received by the first receiver 3401*a* described in FIG. 34, and the metadata (or signaling information) may be received by the second receiver 3401*b* through a separate delivery entity.

The control method for the VR device according to some embodiments of the present invention may extract the sub-bitstreams included in the 360-degree video bitstreams (S3501). As described above in detail, the sub-bitstreams may include Region of Interest (ROI) for the 360-degree video bitstreams. At this time, the sub-bitstreams corresponding to the ROI or the ROI may be determined by the various methods as described in FIG. 26. Also, if the 360-degree video bitstreams include only data (that is, the sub-bitstreams for ROI) for the VR video as described above, this step may selectively be performed, or may be omitted as the case may be. The step S3501 may be performed by the bitstream extractor according to some embodiments of the present invention.

The control method for the VR device according to some embodiments of the present invention may generate restoration data for ROI from the sub-bitstreams (S3502). As described above, in this step, video decoding may be performed for the sub-bitstreams to generate restoration data for ROI. The step S3502 may be performed by the video decoder or the thumbnail generator according to some embodiments of the present invention.

The control method for the VR device according to some embodiments of the present invention may generate thumbnail data by remapping restoration data for ROI (S3503). The remapping according to some embodiments of the present invention may be performed based on the signaling information. As described above, the signaling information may be information included in the 360-degree video bitstreams, or signaling information (or metadata) received through a separate delivery entity. The signaling information may include information related to unpacking for the 360-degree video bitstreams, thumbnail region information for extracting the sub-bitstreams for ROI from the 360-degree video bitstreams, and/or packing/rotation information for extracting thumbnail data from the restoration data for the ROI. The step S3503 may be performed by the remapping (or remapping block or remapper) according to some embodiments of the present invention.

If the metadata (or signaling information) are received through a separate delivery entity, the control method for the VR device according to some embodiments of the present invention may parse the metadata (signaling information) received through the separate delivery entity by the parser according to some embodiments of the present invention.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The apparatus for transmitting a video, the apparatus for receiving a video according to embodiments of the present invention and/or internal modules/blocks thereof may perform the above-described embodiments.

A description will be given of the apparatus and/or the method according to embodiments of the present invention The internal blocks/modules, etc. of the apparatus and/or the method described above may correspond to processors that execute continuous operations stored in a memory, or hardware elements positioned inside/outside the apparatuses according to a given embodiment, or software elements.

The above-described modules may be omitted according to a given embodiment or replaced by other modules that perform similar/the same operations.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a Virtual Reality (VR) device, the method comprising
   receiving a 360 video bitstream;
   extracting a sub-bitstream included in the 360 video bitstream,
   wherein the sub-bitstream includes Region of Interest (ROI) for the 360 video bitstream;
   decoding the 360 video bitstream in accordance with a scalable coding scheme;
   performing inter-layer prediction (ILP) for the 360 video bitstream;
   performing inter-prediction (IP) for blocks of the 360 video bitstream;
   generating restoration data for the ROI from the sub-bitstream; and
   generating thumbnail data by remapping the restoration data for the ROI based on signaling information;
   wherein the ROI is a region for which down-sampling is not performed or a region which is less down-sampled during region-wise packing,
   wherein the signaling information includes a region-wise packing parameter representing information related to the down-sampling,
   wherein the restoration data for the ROI is generated based on the region-wise packing parameter, and
   wherein the region-wise packing parameter packs high-priority part of the ROI into a larger image and rest of the ROI into a smaller image,
   wherein the ILP indicates prediction of higher spatial resolution or quality signal by means of low spatial resolution or quality signal,
   wherein the IP indicates prediction from decoded samples of a current decoded picture and reference pictures,
   wherein the IP includes temporal inter-prediction,
   wherein Motion Constrained Tile Set (MCTS) restricts a range of temporal inter-prediction to a current tile internal range.

2. The method of claim 1,
   wherein when the signaling information is included in the 360 video bitstream, the signaling information includes information related to unpacking for the 360 video bitstream.

3. The method of claim 1,
   wherein when the signaling information is received separately from the 360 video bitstream, the controlling the VR device includes parsing the separately received signaling information,
   wherein the signaling information includes first information for extracting the sub-bitstream for the ROI from the 360 video bitstream and second information for extracting thumbnail data from the restoration data for the ROI.

4. The method of claim 1,
   wherein when the 360 video bitstream only includes the sub-bitstream for the ROI, the VR device generates the thumbnail data by remapping the restoration data for the ROI without extracting the sub-bitstream.

5. The method of claim 1,
wherein when the 360 video bitstream includes an overlay region, the overlay region is used as the ROI.

6. The method of claim 1,
wherein when the 360 video bitstream is classified to a first tile and a second tile and a number of bits for the first tile is greater than a number of bits for the second tile, the first tile is used as the ROI.

7. The method of claim 1,
wherein when the 360 video bitstream is received based on a Dynamic Adaptive Streaming over HTTP (DASH) protocol,
a Media Presentation Description (MPD) delivered by the DASH protocol includes information for the ROI,
wherein the ROI is determined based on the information for the ROI included in the MPD.

8. The method of claim 1,
wherein when the 360 video bitstream is received based on a scalable coding scheme, the 360 video bitstream includes a base layer including data of a first resolution and an enhancement layer including data of a second resolution,
the first resolution is lower than the second resolution,
wherein the ROI is determined based on the base layer.

9. The method of claim 1,
wherein the 360 video bitstream is data stored based on one of file formats, the file formats include MP4 file format, MKV file format and TS file format.

10. A Virtual Reality (VR) device, the device comprising
a receiver configured to receive a 360 video bitstream;
a bitstream extractor configured to extract a sub-bitstream included in the 360 video bitstream,
wherein the sub-bitstream includes Region of Interest (ROI) for the 360 video bitstream;
a decoder configured to decode the 360 video bitstream in accordance with a scalable coding scheme;
an inter-layer predictor configured to perform inter-layer prediction (ILP) for the 360 video bitstream;
an inter-predictor to perform inter-prediction (IP) for blocks of the 360 video bitstream;
a thumbnail generator configured to generate restoration data for the ROI from the sub-bitstream; and
a remapper configured to generate thumbnail data by remapping the restoration data for the ROI based on signaling information;
wherein the ROI is a region for which down-sampling is not performed or a region which is less down-sampled during region-wise packing,
wherein the signaling information includes a region-wise packing parameter representing information related to the down-sampling,
wherein the restoration data for the ROI is generated based on the region-wise packing parameter, and
wherein the region-wise packing parameter packs high-priority part of the ROI into a larger image and rest of the ROI into a smaller image,
wherein the ILP indicates prediction of higher spatial resolution or quality signal by means of low spatial resolution or quality signal,
wherein the IP indicates prediction from decoded samples of a current decoded picture and reference pictures,
wherein the IP includes temporal inter-prediction,
wherein Motion Constrained Tile Set (MCTS) restricts a range of temporal inter-prediction to a current tile internal range.

11. The device of claim 10,
wherein when the signaling information is included in the 360 video bitstream, the signaling information includes information related to unpacking for the 360 video bitstream.

12. The device of claim 11,
wherein when the signaling information is received separately from the 360 video bitstream, the VR device further includes a parser configured to parse the separately received signaling information,
wherein the signaling information includes first information for extracting the sub-bitstream for the ROI from the 360 video bitstream and second information for extracting thumbnail data from the restoration data for the ROI.

13. The device of claim 11,
wherein when the 360 video bitstream only includes the sub-bitstream for the ROI, the VR device generates the thumbnail data by remapping the restoration data for the ROI without extracting the sub-bitstream.

14. The device of claim 11,
wherein when the 360 video bitstream includes an overlay region, the overlay region is used as the ROI.

15. The device of claim 11,
wherein when the 360 video bitstream is classified to a first tile and a second tile and a number of bits for the first tile is greater than a number of bits for the second tile, the first tile is used as the ROI.

16. The device of claim 10,
wherein when the 360 video bitstream is received based on a Dynamic Adaptive Streaming over HTTP (DASH) protocol,
a Media Presentation Description (MPD) delivered by the DASH protocol includes information for the ROI,
wherein the ROI is determined based on the information for the ROI included in the MPD.

17. The device of claim 11,
wherein when the 360 video bitstream is received based on a scalable coding scheme, the 360 video bitstream includes a base layer including data of a first resolution and an enhancement layer including data of a second resolution,
the first resolution is lower than the second resolution,
wherein the ROI is determined based on the base layer.

18. The device of claim 11,
wherein the 360 video bitstream is data stored based on one of file formats, the file formats include MP4 file format, MKV file format and TS file format.

* * * * *